(12) United States Patent
Kim et al.

(10) Patent No.: US 12,175,023 B2
(45) Date of Patent: Dec. 24, 2024

(54) METHOD AND DEVICE FOR DISPLAYING NOTIFICATION MESSAGE

(71) Applicant: SAMSUNG ELECTRONICS CO., LTD., Suwon-si (KR)

(72) Inventors: Taeyeong Kim, Suwon-si (KR); Jookwan Lee, Suwon-si (KR); Myunghoon Kwak, Suwon-si (KR); Yangwook Kim, Suwon-si (KR); Jihea Park, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/177,122

(22) Filed: Mar. 2, 2023

(65) Prior Publication Data

US 2023/0305642 A1    Sep. 28, 2023

Related U.S. Application Data

(63) Continuation of application No. PCT/KR2022/020571, filed on Dec. 16, 2022.

(30) Foreign Application Priority Data

Jan. 26, 2022 (KR) .......... 10-2022-0011555
Apr. 1, 2022 (KR) .......... 10-2022-0041038

(51) Int. Cl.
*G06F 3/03* (2006.01)
*G06F 1/16* (2006.01)
(Continued)

(52) U.S. Cl.
CPC .......... *G06F 3/0304* (2013.01); *G06F 1/1652* (2013.01); *G06F 3/0421* (2013.01); *G06F 3/0482* (2013.01); *G06F 3/0605* (2013.01)

(58) Field of Classification Search
CPC .... G06F 3/0304; G06F 1/1652; G06F 3/0421; G06F 3/048; G06F 3/0605; G06F 3/14; G06F 9/451
See application file for complete search history.

(56) References Cited

U.S. PATENT DOCUMENTS 9,830,075 B2 * 11/2017 Kim .................. G06F 1/1641
10,990,208 B2    4/2021 Jung et al.
(Continued)

FOREIGN PATENT DOCUMENTS

JP        2008177810 A    7/2008
KR    1020170048007 A    5/2017
(Continued)

OTHER PUBLICATIONS

International Search Report mailed Mar. 21, 2023 for PCT/KR2022/020571. In conformance with MPEP 609—Concise explanation of the relevance includes issue date of the foreign OA and references cited therein.

*Primary Examiner* — Mihir K Rayan
(74) *Attorney, Agent, or Firm* — CANTOR COLBURN LLP

(57) ABSTRACT

An electronic device identifies an occurrence of a first event for displaying a first notification message on at least a portion of the display module of the first shape, detects a beginning of shape transformation of the display module from the first shape to the second shape, and maintains the display of the first notification message during the shape transformation of the display module.

17 Claims, 22 Drawing Sheets

(51) Int. Cl.
    *G06F 3/042*     (2006.01)
    *G06F 3/0482*    (2013.01)
    *G06F 3/06*      (2006.01)

(56) References Cited

U.S. PATENT DOCUMENTS

| | | | |
|---|---|---|---|
| 2016/0026381 A1* | 1/2016 | Kim | G06F 3/04817 |
| | | | 715/761 |
| 2016/0378270 A1* | 12/2016 | Lee | G06F 1/1647 |
| | | | 715/788 |
| 2020/0314226 A1 | 10/2020 | Kumar Agraweal et al. | |
| 2021/0223952 A1 | 7/2021 | Oh et al. | |
| 2021/0333873 A1* | 10/2021 | Oguma | G06Q 30/0267 |

FOREIGN PATENT DOCUMENTS

| | | |
|---|---|---|
| KR | 102066569 B1 | 1/2020 |
| WO | 2021045276 A1 | 3/2021 |
| WO | 2021149840 A1 | 7/2021 |

* cited by examiner

METHOD AND DEVICE FOR DISPLAYING NOTIFICATION MESSAGE

CROSS-REFERENCE TO RELATED APPLICATIONS

This application is a continuation application of International Application No. PCT/KR2022/020571 designating the United States, filed on Dec. 16, 2022, in the Korean Intellectual Property Receiving Office and claiming priority to Korean Patent Application No. 10-2022-0011555, filed on Jan. 26, 2022, and Korean Patent Application No. 10-2022-0041038, filed on Apr. 1, 2022, in the Korean Intellectual Property Office, the disclosures of which are incorporated by reference herein in their entireties.

BACKGROUND

1. Field

The disclosure relates to a device and method of displaying a notification message.

2. Description of Related Art

Various functions related to an application have been developed to be used in an electronic device. For example, in the electronic device, a notification message related to an application may be received. The electronic device may display, on a screen, the notification message received through the application.

Recently, an electronic device with a flexible display module that may change its shape has been developed. A foldable electronic device and a rollable electronic device are examples of the electronic device with the flexible display. A user may need to grip the electronic device with both hands to stably grip the electronic device during shape transformation of the display module. When the user desires to execute an application for a notification message by selecting the notification message displayed on the screen during shape transformation of the display module, there is a problem that the user needs to use both hands gripping the electronic device. Although the user recognizes that the notification message is displayed on the screen, in case the display of the notification message is already dismissed after the end of shape transformation of the display, the user may find and identify each notification message, which is inconvenient.

SUMMARY

Conventionally, since there is no electronic device with a display module that transforms its shape, an interaction method on a notification message that occurred during shape transformation of the display module or a notification message that occurred before shape transformation of the display module has not been considered.

An electronic device according to one embodiment may display a notification message after the shape of a display module is transformed by waiting for dismissing the display of the notification message during shape transformation of the display module. Even after the shape transformation of the display module ends, the electronic device may allow the user to identify the notification message that occurred before the completion of the shape transformation of the display module.

According to one embodiment, an electronic device includes: a display module transformable from a first shape to a second shape, a memory configured to store computer-executable instructions, and a processor configured to execute the computer-executable instructions by accessing the memory. The processor is configured to identify an occurrence of an event for displaying a notification message on at least a portion of the display module, detect a beginning and an end of shape transformation of the display module from the first shape to the second shape, when the notification message is displayed in response to identifying the occurrence of the event before the beginning of the shape transformation of the display module, wait for dismissing the display of the notification message during the shape transformation of the display module from the first shape to the second shape, and when the occurrence of the event is identified during the shape transformation of the display module from the first shape to the second shape, wait to display the notification message during the shape transformation and display the notification message after the end of shape transformation of the display module.

According to one embodiment, a method implemented by a processor includes: identifying an occurrence of an event for displaying a notification message on at least a portion of a display module that is transformable from a first shape to a second shape, detecting a beginning and an end of shape transformation of the display module from the first shape to the second shape, when the notification message is displayed in response to identifying the occurrence of the event before the beginning of the shape transformation of the display module, waiting for dismissing the display of the notification message during the shape transformation of the display module from the first shape to the second shape, and when the occurrence of the event is identified during the shape transformation of the display module from the first shape to the second shape, waiting for displaying the notification message during the shape transformation and displaying the notification message after the end of shape transformation of the display module.

According to one embodiment, an electronic device may display a notification message after shape transformation of a display module is completed by waiting for dismissing the display of the notification message during the shape transformation of the display module.

According to one embodiment, an electronic device may prevent usability of a user from being deteriorated by displaying a notification message for a time longer than necessary by changing a duration of a timer related to the display of the notification message, based on at least one of a time duration to transform the shape of the display module and a speed of shape transformation of the display module.

According to one embodiment, the electronic device may effectively prevent a risk of dropping the electronic device due to an unstable grip of the electronic device as a user selects a notification message during shape transformation of the display module by deactivating the notification message during shape transformation of the display module.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
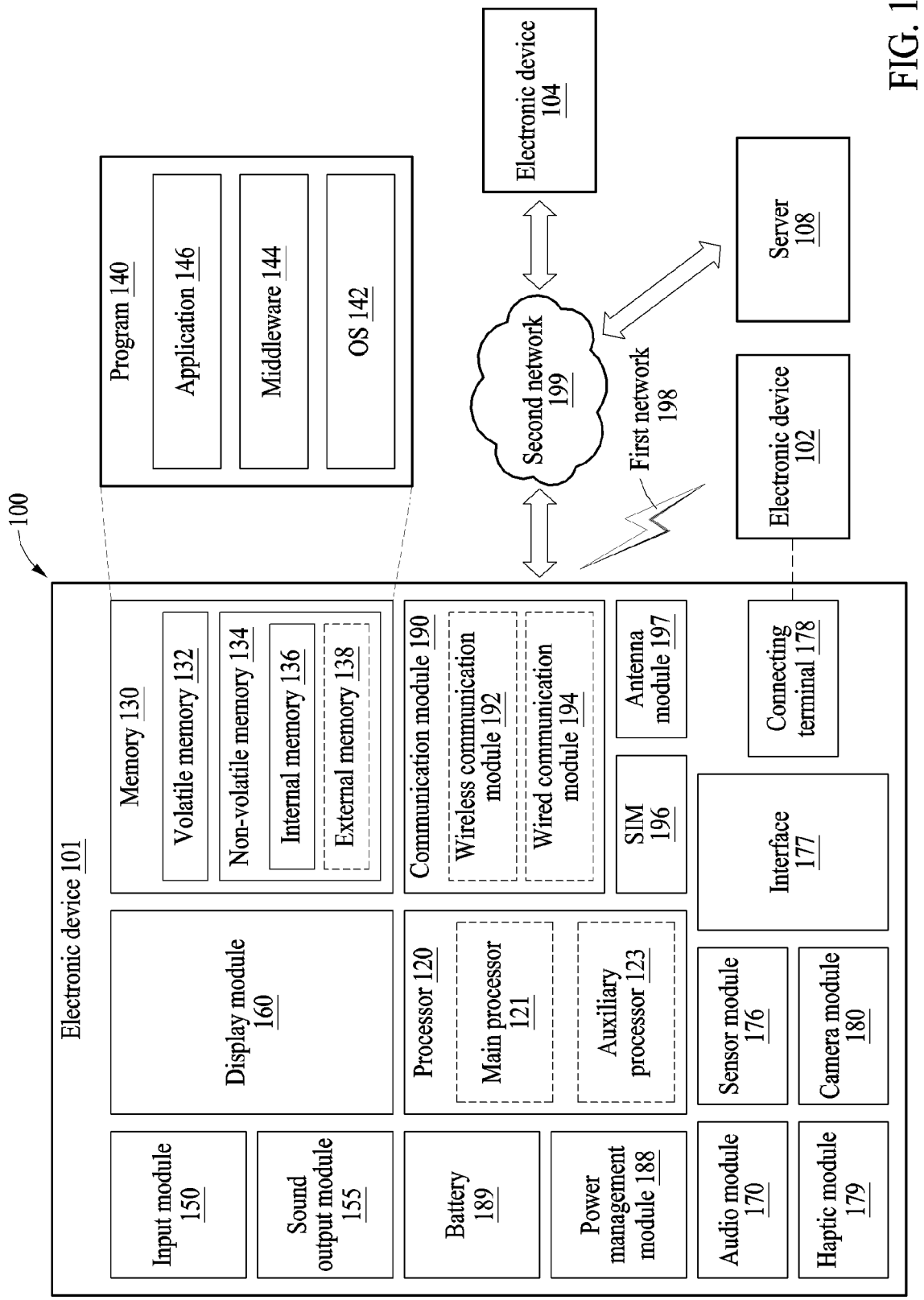
FIG. 1 is a block diagram illustrating an electronic device in a network environment according to one embodiment.

Hereinafter, embodiments will be described in detail with reference to the accompanying drawings. When describing the embodiments with reference to the accompanying drawings, like reference numerals refer to like elements and a repeated description related thereto will be omitted.

FIG. 1 is a block diagram illustrating an electronic device 101 in a network environment 100 according to one embodiment. Referring to FIG. 1, the electronic device 101 in the network environment 100 may communicate with an electronic device 102 via a first network 198 (e.g., a short-range wireless communication network), or communicate with at least one of an electronic device 104 or a server 108 via a second network 199 (e.g., a long-range wireless communication network). According to one embodiment, the electronic device 101 may communicate with the electronic device 104 via the server 108. According to one embodiment, the electronic device 101 may include a processor 120, a memory 130, an input module 150, a sound output module 155, a display module 160, an audio module 170, and a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the above components may be omitted from the electronic device 101, or one or more other components may be added to the electronic device 101. In some embodiments, some (e.g., the sensor module 176, the camera module 180, or the antenna module 197) of the components may be integrated as a single component (e.g., the display module 160).

The processor 120 may execute, for example, software (e.g., a program 140) to control at least one other component (e.g., a hardware or software component) of the electronic device 101 connected to the processor 120, and may perform various data processing or computation. According to one embodiment, as at least a part of data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to one embodiment, the processor 120 may include a main processor 121 (e.g., a central processing unit (CPU) or an application processor (AP)) or an auxiliary processor 123 (e.g., a graphics processing unit (GPU), a neural processing unit (NPU), an image signal processor (ISP), a sensor hub processor, or a communication processor (CP)) that is operable independently from, or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). According to one embodiment, the auxiliary processor 123 (e.g., an ISP or a CP) may be implemented as a portion of another component (e.g., the camera module 180 or the communication module 190) that is functionally related to the auxiliary processor 123. According to one embodiment, the auxiliary processor 123 (e.g., an NPU) may include a hardware structure specified for artificial intelligence (AI) model processing. An AI model may be generated through machine learning. Such learning may be performed by, for example, the electronic device 101 in which artificial intelligence is performed, or performed via a separate server (e.g., the server 108). Learning algorithms may include, but are not limited to, for example, supervised learning, unsupervised learning, semi-supervised learning, or reinforcement learning. The AI model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), a bidirectional recurrent deep neural network (BRDNN), a deep Q-network, or a combination of two or more thereof, but is not limited thereto. The AI model may additionally or alternatively include a software structure other than the hardware structure.

The memory 130 may store various data used by at least one component (e.g., the processor 120 or the sensor module 176) of the electronic device 101. The various pieces of data may include, for example, software (e.g., the program 140) and input data or output data for a command related thereto. The memory 130 may include the volatile memory 132 or the non-volatile memory 134.

The program 140 may be stored as software in the memory 130 and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing record. The receiver may be used to receive an incoming call. According to one embodiment, the receiver may be implemented separately from the speaker or as a part of the speaker.

The display module 160 may visually provide information to the outside (e.g., a user) of the electronic device 101. The display module 160 may include, for example, a display, a hologram device, or a projector and control circuitry to control a corresponding one of the display, the hologram device, and the projector. According to one embodiment, the display module 160 may include a touch sensor adapted to sense a touch, or a pressure sensor adapted to measure an intensity of a force incurred by the touch.

The audio module 170 may convert a sound into an electrical signal or vice versa. According to one embodiment, the audio module 170 may obtain the sound via the input module 150 or output the sound via the sound output module 155 or an external electronic device (e.g., an electronic device 102 such as a speaker or headphones) directly or wirelessly connected to the electronic device 101.

The sensor module 176 may detect an operational state (e.g., power or temperature) of the electronic device 101 or an environmental state (e.g., a state of a user) external to the electronic device 101, and generate an electric signal or data value corresponding to the detected state. According to one embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., by wire) or wirelessly. According to one embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to one embodiment, the connecting terminal 178 may include, for example, an HDMI connector, a USB connector, an SD card connector, or an audio connector (e.g., a headphone connector).

The haptic module 179 may convert an electric signal into a mechanical stimulus (e.g., a vibration or a movement) or an electrical stimulus which may be recognized by a user via his or her tactile sensation or kinesthetic sensation. According to one embodiment, the haptic module 179 may include, for example, a motor, a piezoelectric element, or an electric stimulator.

The camera module 180 may capture a still image and moving images. According to one embodiment, the camera module 180 may include one or more lenses, image sensors, ISPs, or flashes.

The power management module 188 may manage power supplied to the electronic device 101. According to one embodiment, the power management module 188 may be implemented as, for example, at least a part of a power management integrated circuit (PMIC).

The battery 189 may supply power to at least one component of the electronic device 101. According to one embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more CPs that are operable independently from the processor 120 (e.g., an AP) and that support a direct (e.g., wired) communication or a wireless communication. According to one embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196. For reference, the communication module may establish communication with a target device (e.g., the electronic device 104) for mirroring display.

The wireless communication module 192 may support a 5G network after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beam-forming, or a large scale antenna. The wireless communication module 192 may support various requirements specified in the electronic device 101, an external electronic device (e.g., the electronic device 104), or a network system (e.g., the second network 199). According to one embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., an external electronic device) of the electronic device 101. According to one embodiment, the antenna module 197 may include an antenna including a radiating element including a conductive material or a conductive pattern formed in or on a substrate (e.g., a printed circuit board (PCB)). According to one embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or power may be transmitted or received between the communication module 190 and the external electronic device via the at least one selected antenna. According to one embodiment, another component (e.g., a radio frequency integrated circuit (RFIC)) other than the radiating element may be additionally formed as a part of the antenna module 197.

According to one embodiment, the antenna module 197 may form a mmWave antenna module. According to one embodiment, the mmWave antenna module may include a PCB, an RFIC disposed on a first surface (e.g., a bottom surface) of the PCB or adjacent to the first surface and capable of supporting a designated a high-frequency band (e.g., a mmWave band), and a plurality of antennas (e.g., array antennas) disposed on a second surface (e.g., a top or a side surface) of the PCB, or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to one embodiment, commands or data may be transmitted or received between the electronic device 101 and the external electronic device 104 via the server 108 coupled with the second network 199. Each of the external electronic devices 102 and 104 may be a device of the same type as or a different type from the electronic device 101. According to one embodiment, all or some of operations to be executed by the electronic device 101 may be executed at one or more external electronic devices (e.g., the external electronic devices 102 and 104, and the server 108). For example, if the electronic device 101 needs to perform a function or a service automatically, or in response to a request from a user or another device, the electronic device 101, instead of, or in addition to, executing the function or the service, may request one or more external electronic devices to perform at least part of the function or the service. The one or more external electronic devices receiving the request may perform the at least part of the function or the service requested, or an additional function or an additional service related to the request, and may transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or MEC. The external electronic device 104 may be a target device with a target display that may output an image. In one embodiment, the external electronic device 104 may include an Internet-of-things (IoT) device. The server 108 may be an intelligent server using machine learning and/or a neural network. According to one embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
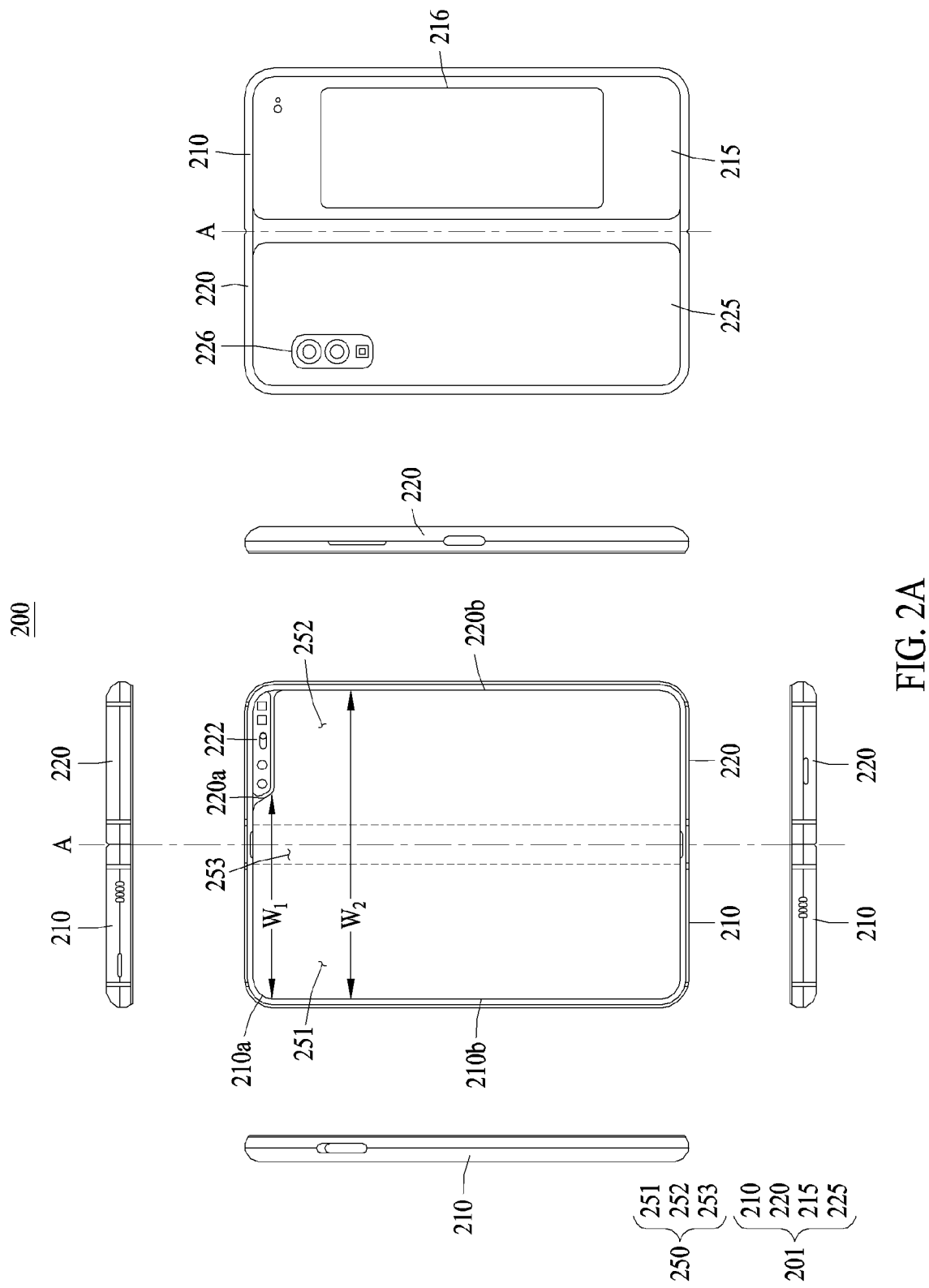
FIGS. 2A and 2B are front perspective views of an electronic device in a closed state and an open state, according to one embodiment.
Figure 2B:
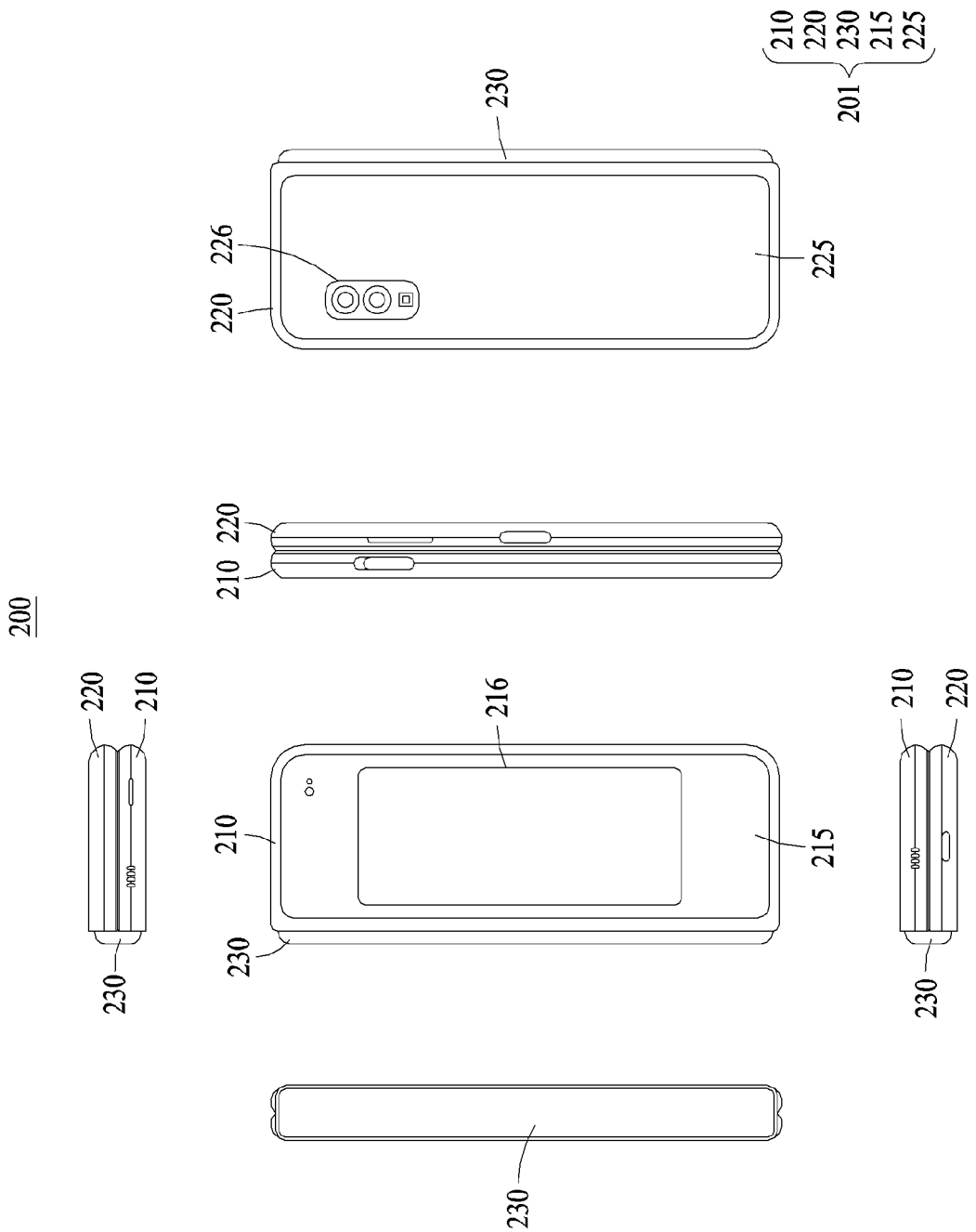
Figure 2C:
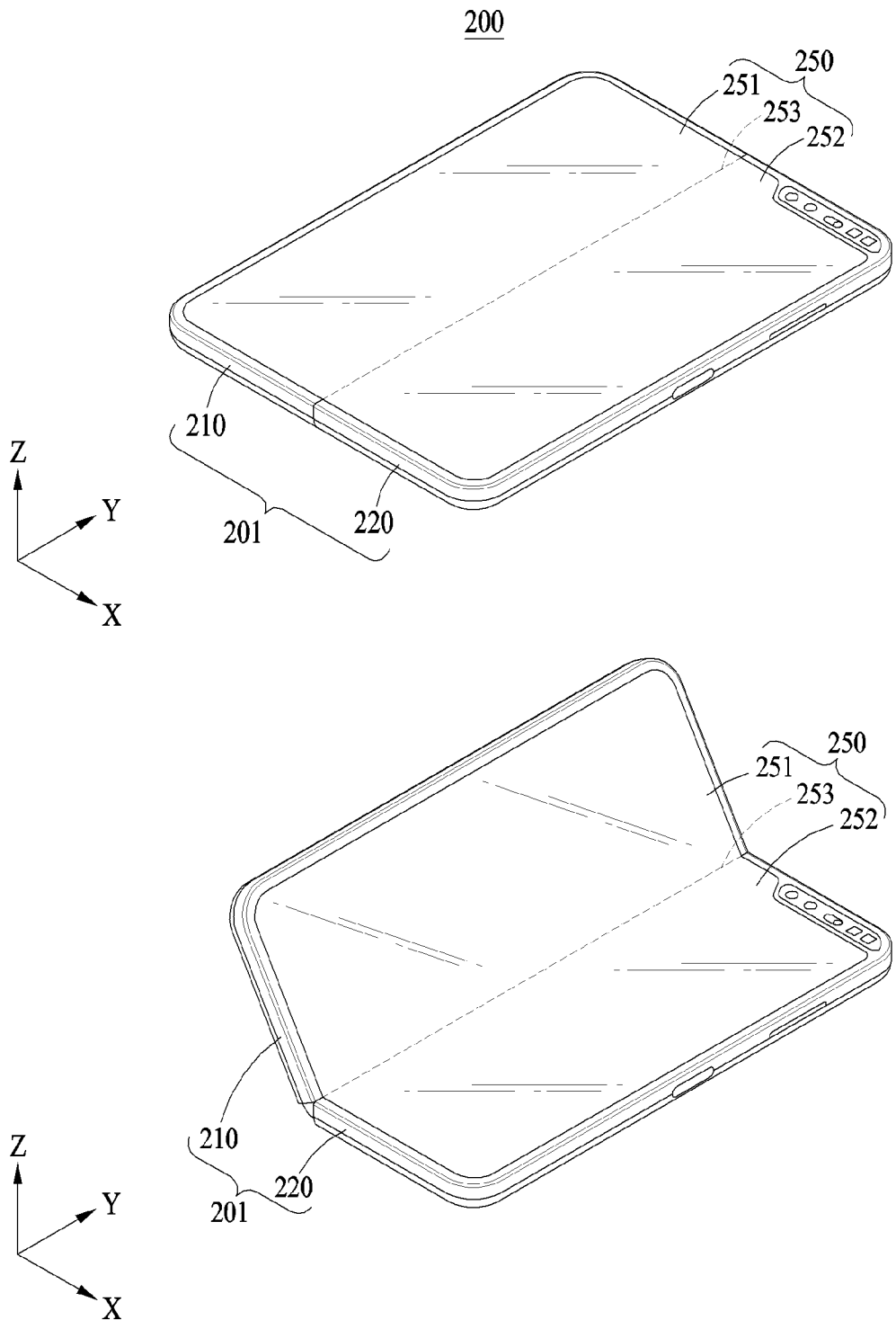
FIG. 2C is a perspective view illustrating an example of a fully unfolded state or an intermediate state of the electronic device according to one embodiment.

FIG. 2A is a diagram illustrating an unfolded state of an electronic device 200 according to one embodiment. FIG. 2B is a diagram illustrating a folded state of the electronic device 200 according to one embodiment. FIG. 2C is a perspective view illustrating an example of a fully unfolded state or an intermediate state (e.g., partially unfolded) of the electronic device 200 according to one embodiment.

The electronic device 200 of FIGS. 2A through 2C is an example of the electronic device 101 of FIG. 1 and may be a foldable or bendable electronic device.

In FIG. 2C and other following drawings, illustrated is a spatial coordinate system defined by an X axis, a Y axis, and a Z axis that are orthogonal to each other. Here, the X-axis may represent a width direction of an electronic device, the Y-axis may represent a length direction of the electronic device, and the Z-axis may represent a height (or thickness) direction of the electronic device. In the following description, a "first direction" may refer to a direction parallel to the Z-axis.

Referring to FIGS. 2A and 2B, in one embodiment, the electronic device 200 may include a foldable housing 201 and a flexible or foldable display 250 (hereinafter, the "display" 250 in short) (e.g., the display module 160 of FIG. 1) disposed in a space formed by the foldable housing 201. A surface on which the display 250 is disposed (or a surface on which the display 250 is viewed from the outside of the electronic device 200) may be defined as a front surface of the electronic device 200. In addition, a surface opposite to the front surface may be defined as a rear surface of the electronic device 200. Further, a surface surrounding a space between the front surface and the rear surface may be defined as a side surface of the electronic device 200.

According to one embodiment, the foldable housing 201 may include a first housing structure 210, a second housing structure 220 including a sensor area 222, a first rear cover 215, a second rear cover 225, and a hinge structure 230. Here, the hinge structure 230 may include a hinge cover that covers a foldable portion of the foldable housing 201. The foldable housing 201 of the electronic device 200 is not limited to the shape and combination shown in FIGS. 2A and 2B, and may be implemented in a different shape or a different combination of components. For example, in one embodiment, the first housing structure 210 and the first rear cover 215 may be integrally formed, and the second housing structure 220 and the second rear cover 225 may be integrally formed.

According to one embodiment, the first housing structure 210 may be connected to the hinge structure 230 and may include a first surface facing a first direction and a second surface facing a second direction opposite to the first direction. The second housing structure 220 may be connected to the hinge structure 230 and may include a third surface facing a third direction and a fourth surface facing a fourth direction opposite to the third direction. The second housing structure 220 may rotate with respect to the first housing structure 210 about the hinge structure 230. A state of the electronic device 200 may be changed to a folded state or an unfolded state.

According to one embodiment, the first surface may face the third surface in a state in which the electronic device 200 is fully folded and the third direction may be identical to the first direction in a state in which the electronic device 200 is fully unfolded.

According to one embodiment, the first housing structure 210 and the second housing structure 220 are disposed on both sides with respect to a folding axis A and generally may be symmetrical with respect to the folding axis A. As to be described hereinafter, an angle or distance between the first housing structure 210 and the second housing structure 220 may vary depending on whether the state of the electronic device 200 is the unfolded state, the folded state, or a partially unfolded or folded state (or an intermediate state). According to one embodiment, unlike the first housing structure 210, the second housing structure 220 may additionally include the sensor area 222, in which various sensors are arranged, however, the first housing structure 210 and the second housing structure 220 may have shapes symmetrical to each other in areas other than the sensor area 222.

According to one embodiment, as shown in FIG. 2A, the first housing structure 210 and the second housing structure 220 may together form a recess for accommodating the display 250. In one embodiment, due to the sensor area 222, the recess may have at least two different widths in a direction perpendicular to the folding axis A. For example, the recess may have a first width w1 between a first portion 210a of the first housing structure 210 parallel to the folding axis A and a first portion 220a of the second housing structure 220 formed on a periphery of the sensor area 222, and a second width w2 formed by a second portion 210b of the first housing structure 210 and a second portion 220b of the second housing structure 220 not corresponding to the sensor area 222 and being parallel to the folding axis A. In this case, the second width w2 may be greater than the first width w1. In one embodiment, the first portion 220a and the second portion 220b of the second housing structure 220 may be at different distances from the folding axis A. The widths of the recess are not limited to the shown example. In one embodiment, the recess may have a plurality of widths according to the shape of the sensor area 222 or asymmetrical portions of the first housing structure 210 and the second housing structure 220. According to one embodiment, the sensor area 222 may be formed to have a predetermined area adjacent to one corner of the second housing structure 220. However, the arrangement, shape, and size of the sensor area 222 are not limited to the shown example. For example, in one embodiment, the sensor area 222 may be provided at another corner of the second housing structure 220 or in a predetermined area between an upper corner and a lower corner. In one embodiment, components embedded in the electronic device 200 to perform various functions may be exposed to the front surface of the electronic device 200 through the sensor area 222 or through one or more openings provided in the sensor area 222. In one embodiment, the components may include various types of sensors. The sensors may include, for example, at least one of a front camera, a receiver, or a proximity sensor. According to one embodiment, the sensor area 222 may not be included in the second housing structure 220 or may be formed at a position different from that shown in the drawings.

According to one embodiment, at least a portion of the first housing structure 210 and the second housing structure 220 may be formed of a metal material or a non-metal material having a selected magnitude of rigidity to support the display 250. At least a portion formed of the metal material may provide a ground plane for the electronic device 200, and may be electrically connected to a ground line formed on a printed circuit board (PCB) disposed inside the foldable housing 201.

According to one embodiment, the first rear cover 215 may be disposed on one side of the folding axis A on a rear surface of the electronic device 200, and may have, for example, a substantially rectangular periphery that may be surrounded by the first housing structure 210. Similarly, the second rear cover 225 may be disposed on the other side of the folding axis A on the rear surface of the electronic device 200, and may have a periphery that may be surrounded by the second housing structure 220.

According to one embodiment, the first rear cover 215 and the second rear cover 225 may be substantially symmetrical with respect to the folding axis A. However, the first rear cover 215 and the second rear cover 225 are not necessarily mutually symmetrical. In another example, the electronic device 200 may include a first rear cover 215 and a second rear cover 225 in various shapes. In one embodiment, the first rear cover 215 may be formed integrally with the first housing structure 210, and the second rear cover 225 may be formed integrally with the second housing structure 220.

According to one embodiment, the first rear cover 215, the second rear cover 225, the first housing structure 210, and the second housing structure 220 may form a space in which various components (e.g., a PCB, or a battery) of the electronic device 200 are to be disposed. In one embodiment, one or more components may be disposed or visually exposed on the rear surface of the electronic device 200. For example, at least a portion of a sub-display may be visually exposed through a first rear area 216 of the first rear cover 215. In one embodiment, one or more components or sensors may be visually exposed through a second rear area 226 of the second rear cover 225. In one embodiment, the sensors may include a proximity sensor and/or a rear camera.

According to one embodiment, a front camera exposed to the front surface of the electronic device 200 through one or more openings provided in the sensor area 222, or a rear camera exposed through the second rear area 226 of the second rear cover 225 may include one or more lenses, an image sensor, and/or an image signal processor. A flash may include, for example, a light-emitting diode (LED) or a xenon lamp. In one embodiment, two or more lenses (e.g., infrared camera, wide-angle, and telephoto lenses) and image sensors may be disposed on one surface of the electronic device 200.

Referring to FIG. 2B, the hinge cover may be disposed between the first housing structure 210 and the second housing structure 220 to cover internal components (e.g., the hinge structure 230). According to one embodiment, the hinge structure 230 may be covered by a portion of the first housing structure 210 and a portion of the second housing structure 220, or may be exposed to the outside, depending on the state (e.g., the unfolded state, the intermediate state, or the folded state) of the electronic device 200.

For example, when the electronic device 200 is in the unfolded state (e.g., the fully unfolded state) as illustrated in FIG. 2A, the hinge structure 230 may be covered by the first housing structure 210 and the second housing structure 220 not to be exposed. In another example, when the electronic device 200 is in the folded state (e.g., a fully folded state), as shown in FIG. 2B, the hinge structure 230 may be exposed to the outside between the first housing structure 210 and the second housing structure 220. In another example, when the first housing structure 210 and the second housing structure 220 are in the intermediate state where the first housing structure 210 and the second housing structure 220 are folded with a certain angle, a portion of the hinge structure 230 may be exposed to the outside between the first housing structure 210 and the second housing structure 220. However, the area exposed in this example may be smaller than that in the fully folded state. In one embodiment, the hinge structure 230 may include a curved surface.

According to one embodiment, the display 250 may be disposed in a space formed by the foldable housing 201. For example, the display 250 may be seated in the recess formed by the foldable housing 201 and may be viewed from the outside through the front surface of the electronic device 200. For example, the display 250 may constitute most of the front surface of the electronic device 200. Accordingly, the front surface of the electronic device 200 may include the display 250, and a partial area of the first housing structure 210 and a partial area of the second housing structure 220, which are adjacent to the display 250. In addition, the rear surface of the electronic device 200 may include the first rear cover 215, a partial area of the first housing structure 210 adjacent to the first rear cover 215, the second rear cover 225, and a partial area of the second housing structure 220 adjacent to the second rear cover 225.

According to one embodiment, the display 250 may refer to a display in which at least one area is deformable into a planar surface or a curved surface. In one embodiment, the display 250 may include a folding area 253, a first area 251 disposed on one side of the folding area 253 (e.g., on the left side of the folding area 253 shown in FIG. 2A), and a second area 252 disposed on the other side of the folding area 253 (e.g., on the right side of the folding area 253 shown in FIG. 2A).

However, the area division of the display 250 shown in FIG. 2A is merely an example, and the display 250 may be divided into a plurality of areas (e.g., four or more areas, or two areas) depending on the structure or functions thereof. In an example, as shown in FIG. 2A, the display 250 may be divided into areas based on the folding area 203 extending in parallel to the folding axis A. In another example, the display 250 may be divided into areas based on another folding axis (e.g., a folding axis parallel to a width direction of an electronic device).

According to one embodiment, the display 250 may be coupled to or disposed adjacent to a touch panel in which a touch sensing circuit and a pressure sensor configured to measure an intensity (or pressure) of a touch are provided. For example, the display 250 is an example of a touch panel, and may be coupled to or disposed adjacent to a touch panel for detecting an electromagnetic resonance (EMR) type stylus pen.

According to one embodiment, the first area 251 and the second area 252 may generally have symmetrical shapes with respect to the folding area 253. However, unlike the first area 251, the second area 252 may include a notch cut according to inclusion of the sensor area 222, but the other areas of the second area 252 may be symmetrical to the first area 251. For example, the first area 251 and the second area 252 may include mutually symmetrical portions and mutually asymmetrical portions.

According to one embodiment, an edge thickness of each of the first area 251 and the second area 252 may be different from an edge thickness of the folding area 253. The edge thickness of the folding area 253 may be less than those of the first area 251 and the second area 252. For example, the first area 251 and the second area 252 may be asymmetrical in terms of thickness when cross-sectionally viewed. For example, an edge of the first area 251 may be formed to have a first radius of curvature and an edge of the second area 252 may be formed to have a second radius of curvature that is different from the first radius of curvature. In another example, the first area 251 and the second area 252 may be symmetrical in terms of thickness when cross-sectionally viewed.

Hereinafter, each area of the display 250 and operations of the first housing structure 210 and the second housing structure 220 depending on the state (e.g., a folded state, an unfolded state, or an intermediate state) of the electronic device 200) will be described.

According to one embodiment, when the electronic device 200 is in the unfolded state (e.g., FIG. 2A), the first housing structure 210 and the second housing structure 220 may be arranged to face the same direction with an angle of 180 degrees. The surface of the first area 251 of the display 250 and the surface of the second area 252 thereof may face the same direction (e.g., a front direction of an electronic device) with an angle of 180 degrees. The folding area 253 may form the same plane together with the first area 251 and the second area 252.

According to one embodiment, when the electronic device 200 is in the folded state (e.g., FIG. 2B), the first housing structure 210 and the second housing structure 220 may be arranged to face each other. The surface of the first area 251 and the surface of the second area 252 of the display 250 may face each other and may form a narrow angle (e.g., an angle between 0 degrees to 10 degrees). At least a portion of the folding area 253 may form a curved surface having a predetermined curvature.

According to one embodiment, when the electronic device 200 is in the intermediate state, the first housing structure 210 and the second housing structure 220 may be arranged to form a certain angle therebetween. The surface of the first area 251 and the surface of the second area 252 of the display 250 may form an angle greater than that in the folded state and smaller than that in the unfolded state. At least a portion of the folding area 253 may include a curved surface having a predetermined curvature, and the curvature may be less than that in the folded state.

The upper part of FIG. 2C illustrates a fully unfolded state of the electronic device 200 and the lower part of FIG. 2C illustrates a partially folded state, that is, an intermediate state of the electronic device 200. As described above, the state of the electronic device 200 may be changed to the folded state or the unfolded state. According to one embodiment, when viewed in a direction of a folding axis (e.g., the folding axis A of FIG. 2A), the electronic device 200 may be folded in two types, i.e., an "in-folding" type in which the front surface of the electronic device 200 is folded to form an acute angle, and an "out-folding" type in which the front surface of the electronic device 200 is folded to form an obtuse angle. In an example, in the state in which the electronic device 200 is folded in the in-folding type, the first surface of the first housing structure 210 may face the third surface of the second housing structure 220. In the fully unfolded state, the first surface of the first housing structure 210 and the third surface of the second housing structure 220 may face the same direction (e.g., a direction parallel to the z-axis).

In another example, when the electronic device 200 is folded in the out-folding type, the second surface of the first housing structure 210 may face the fourth surface of the second housing structure 220.

In addition, although not shown in the drawings, the electronic device 200 may include a plurality of hinge axes (e.g., two parallel hinge axes including the folding axis A of FIG. 2A and another axis parallel to the folding axis A). In this example, the electronic device 200 may also be folded in a "multi-folding" type in which the in-folding type is combined with the out-folding type.

The in-folding type may refer to a state in which the display 250 is not exposed to the outside in the fully folded state. The out-folding type may refer to a state in which the display 250 is exposed to the outside in the fully folded state. The lower part of FIG. 2C shows an intermediate state in which the electronic device 200 is partially unfolded in an in-folding process.

Figure 3A:
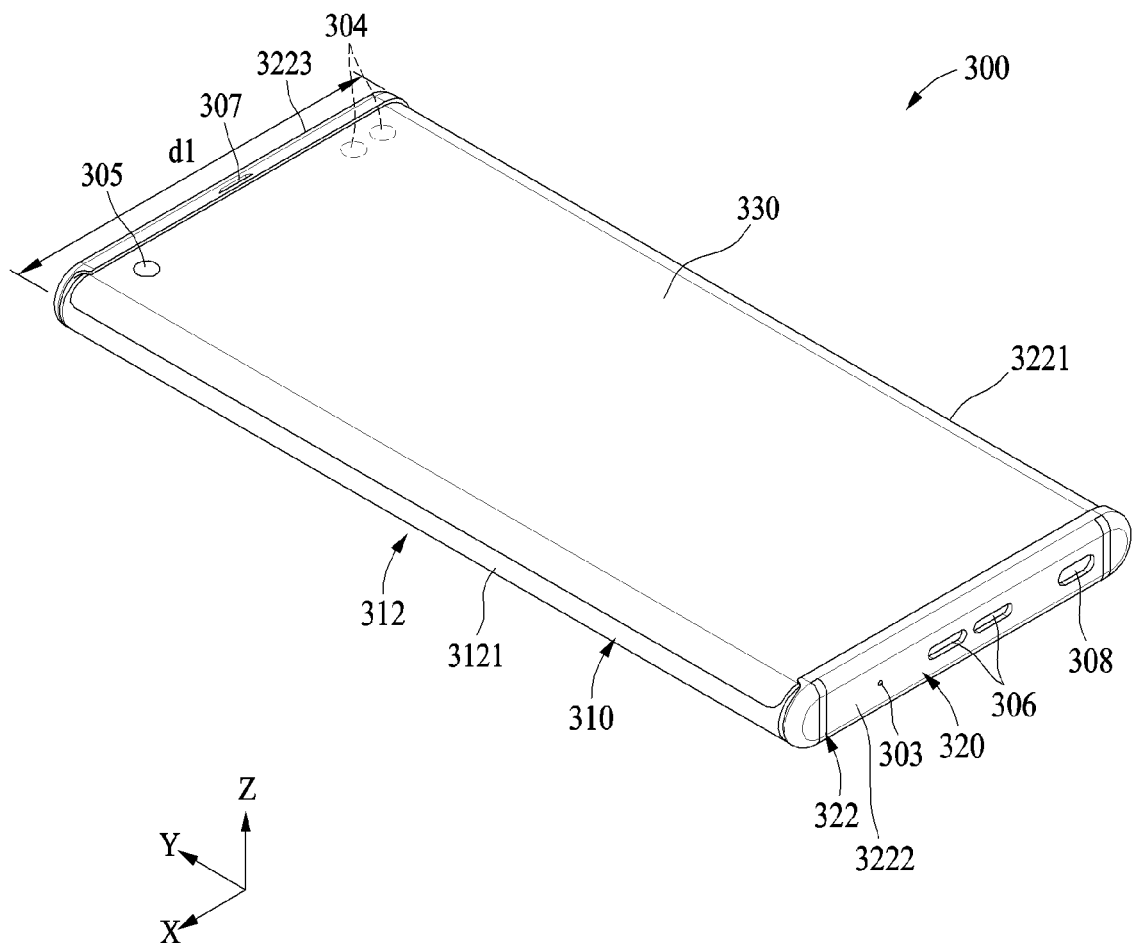
FIGS. 3A and 3B are rear perspective views of an electronic device in a closed state and an open state according to one embodiment.
Figure 3B:
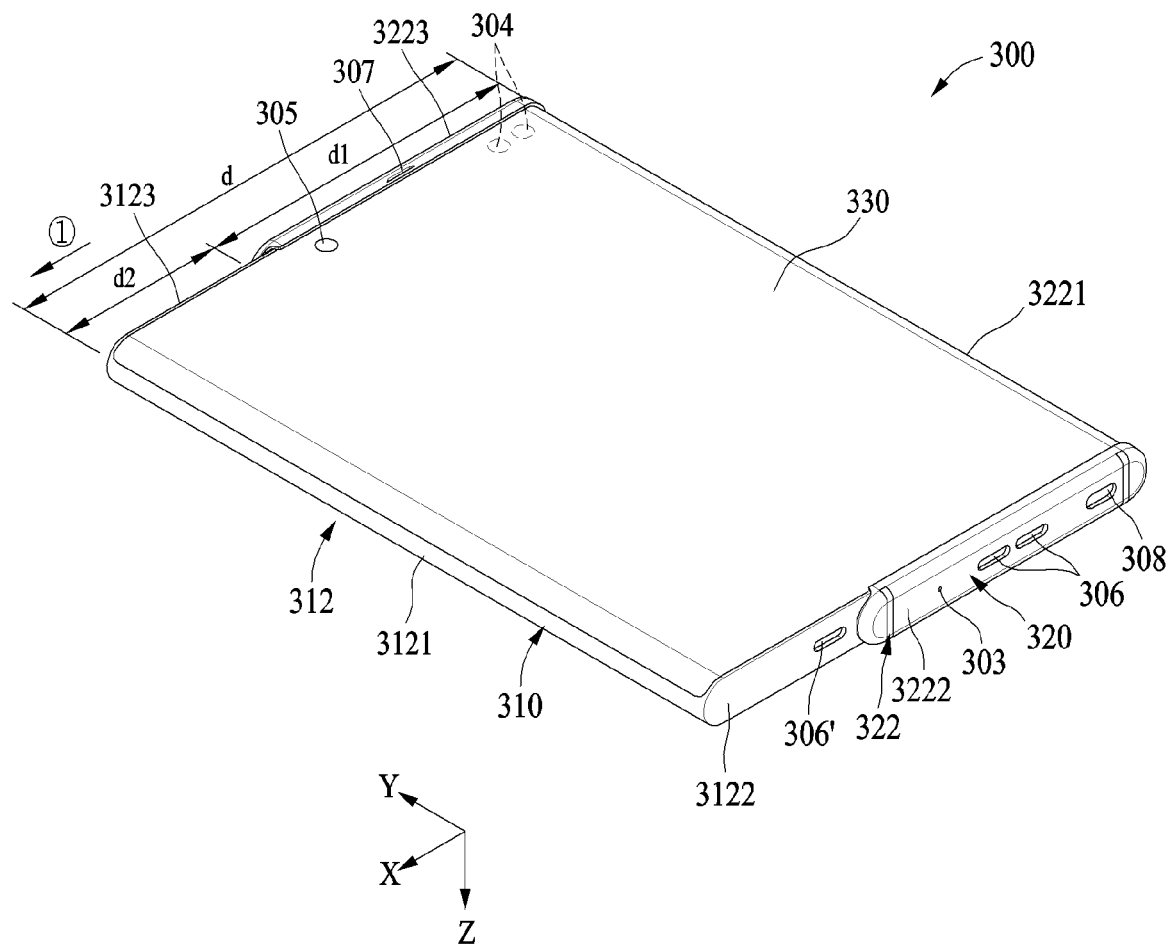
Figure 3C:
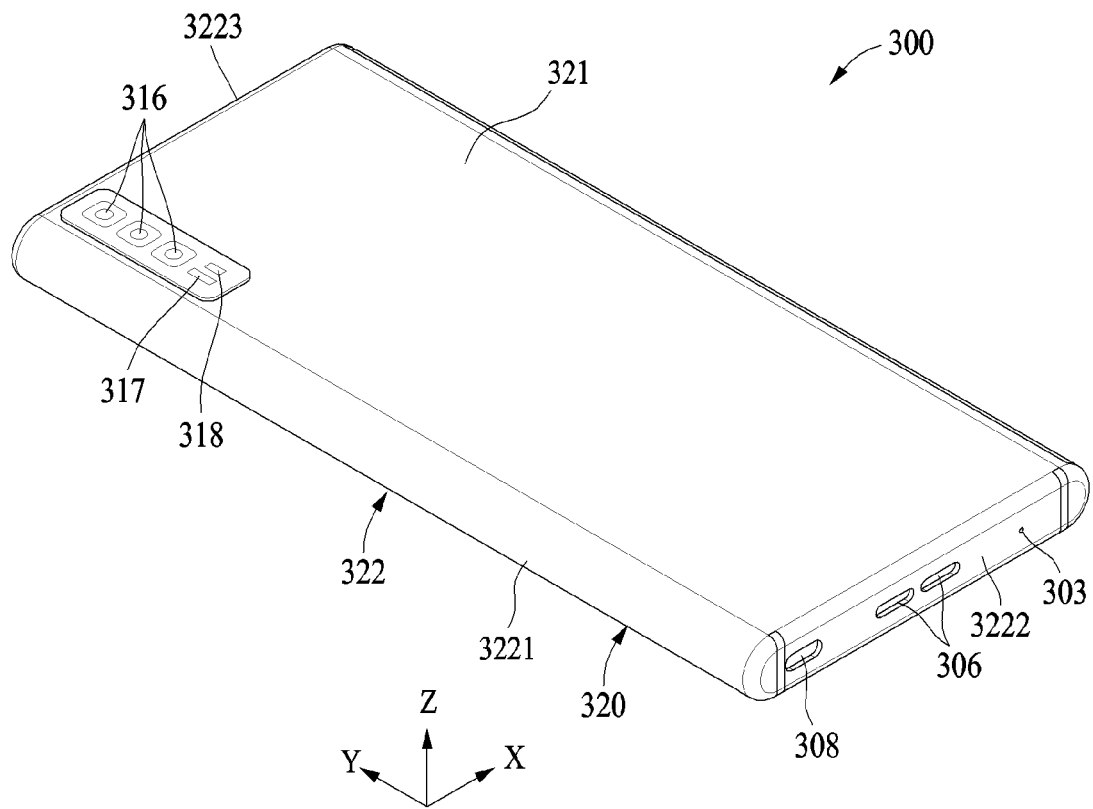
FIGS. 3C and 3D are rear perspective view of the electronic device in a closed state and an open state according to one embodiment.
Figure 3D:
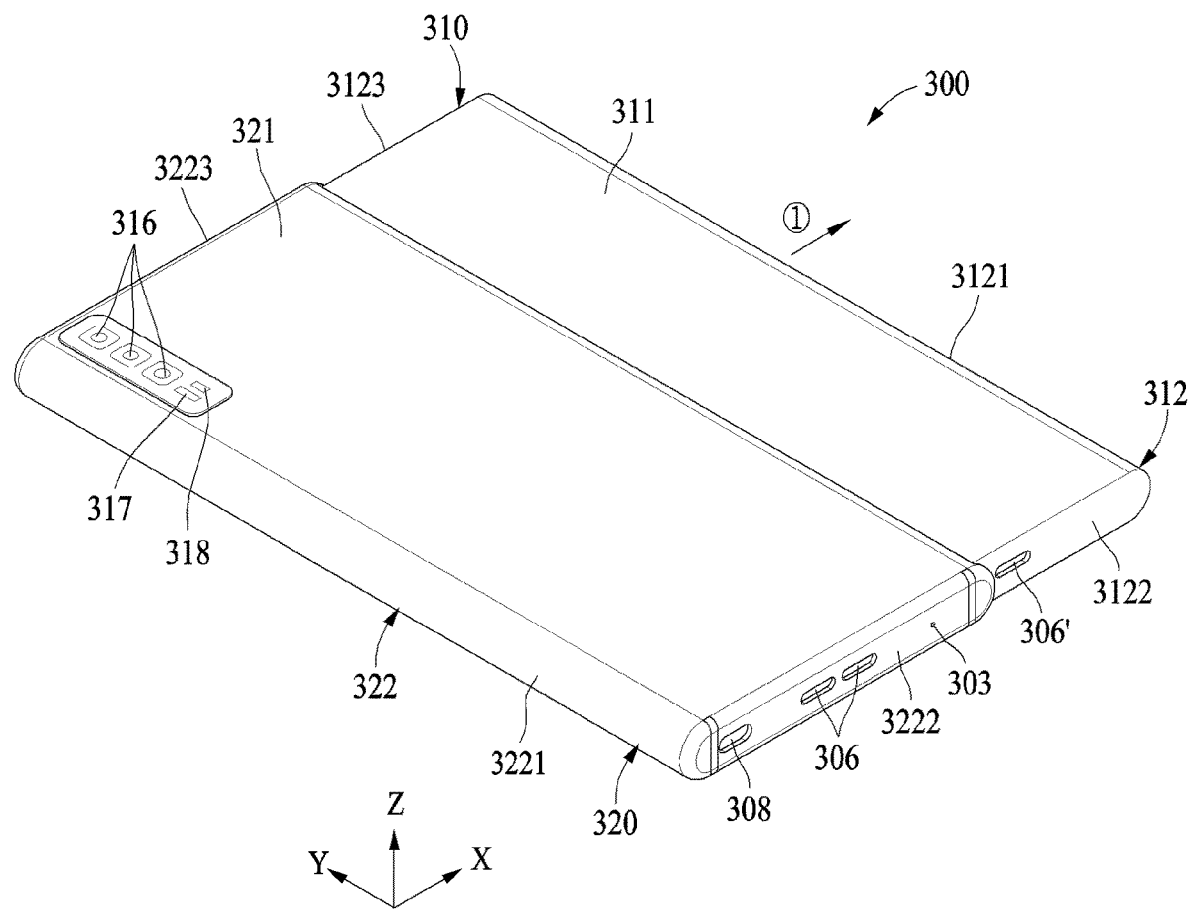

FIGS. 3A and 3B are front perspective views of an electronic device 300 in a closed state and an open state according to one embodiment. FIGS. 3C and 3D are rear perspective view of the electronic device 300 in a closed state and an open state according to one embodiment. The electronic device 300 of FIGS. 3A to 3D may be an example of the electronic device 101 of FIG. 1 and may be a rollable electronic device with an extending display screen.

The electronic device 300 of FIG. 3A may be at least partially similar to the electronic device 101 of FIG. 1, or may further include other embodiments of the electronic device.

Referring to FIGS. 3A to 3D, the electronic device 300 may include a first housing 310 and a second housing 320 that is at least partially movably coupled to the first housing 310. According to one embodiment, the first housing 310 may include a first plate 311 and a first side frame 312 that extends in a substantially vertical direction (e.g., a z-axis direction) along an edge of the first plate 311. According to one embodiment, the first side frame 312 may include a first side surface 3121, a second side surface 3122 extending from one end of the first side surface 3121, and a third side surface 3123 extending from the other end of the first side surface 3121. According to one embodiment, the first housing 310 may include a first space that is at least partially closed from the outside by the first plate 311 and the first side frame 312.

According to one embodiment, the second housing 320 may include a second plate 321, and a second side frame 322 that extends in a substantially vertical direction (e.g., the z-axis direction) along an edge of the second plate 321. According to one embodiment, the second side frame 322 may include a fourth side surface 3221 facing away from the first side surface 3121, a fifth side surface 3222 extending from one end of the fourth side surface 3221 and at least partially coupled to the second side surface 3122, and a sixth side surface 3223 extending from the other end of the fourth side surface 3221 and at least partially coupled to the third side surface 3123. In one embodiment, the fourth side surface 3221 may extend from a structure other than the second plate 321 and may also be coupled to the second plate 321. According to one embodiment, the second housing 320 may include a second space that is at least partially closed from the outside by the second plate 321 and the second side frame 322. According to one embodiment, the first plate 311 and the second plate 321 may be arranged to at least partially form a rear surface of the electronic device 300. For example, the first plate 311, the second plate 321, the first side frame 312, and the second side frame 322 may be formed of, for example, a polymer, coated or colored glass, ceramic, metal (e.g., aluminum, stainless steel (STS), or magnesium), or a combination of two or more of the above materials.

According to one embodiment, the electronic device 300 may include a flexible display 330 arranged to be supported by the first housing 310 and the second housing 320. According to one embodiment, the flexible display 330 may include a flat portion supported by the second housing 320, and a bendable portion extending from the flat portion and supported by the first housing 310. According to one embodiment, the bendable portion of the flexible display 330 may be arranged in the first space of the first housing 310 not to be exposed to the outside when the electronic device 300 is closed, and may be exposed to the outside to extend from the flat portion while being supported by the first housing 310 when the electronic device 300 is open. Accordingly, the electronic device 300 may be a rollable electronic device in which a display screen of the flexible display 330 expands in response to an open operation according to a movement of the first housing 310 from the second housing 320.

According to one embodiment, in the electronic device 300, the first housing 310 may be at least partially inserted into the second space of the second housing 320, and may be coupled to be movable in direction ①. For example, in the closed state, the electronic device 300 may be maintained in a state in which the first housing 310 and the second housing 320 are coupled such that a distance between the first side surface 3121 and the fourth side surface 3221 is a first distance d1. According to one embodiment, in the open state, the electronic device 300 may be maintained in a state in which the first housing 310 protrudes from the second housing 320 to have a second interval distance d in which the first side surface 3121 protrudes from the fourth side surface 3221 by a predetermined distance d2. According to one embodiment, the flexible display 330 may be supported by the first housing 310 and/or the second housing 320 such that both ends thereof have curved edges, in the open state.

According to one embodiment, the electronic device 300 may automatically transition between the open state and the closed state by a driving unit disposed in the first space and/or the second space. For example, a processor (e.g., the processor 120 of FIG. 1) of the electronic device 300 may be configured to control an operation of the first housing 310 using the driving unit when an event for a transition between the open state and the closed state of the electronic device 300 is detected. In one embodiment, the first housing 310 may manually protrude from the second housing 320 through a user's manipulation. In this case, the first housing 310 may protrude by a protrusion amount desired by the user, and thus, display sizes of a screen of the flexible display 330 may vary. Accordingly, the processor (e.g., the processor 120 of FIG. 1) of the electronic device 300 may display an object in various ways corresponding to a display area corresponding to a predetermined protrusion amount of the first housing 310, and may control execution of an application program.

According to one embodiment, the electronic device 300 may include at least one of an input device 303, sound output devices 306 and 307, sensor modules 304 and 317, camera devices 305 and 316, a connector port 308, a key input device (not shown), or an indicator (not shown). In one embodiment, at least one of the components described above of the electronic device 300 may be omitted, or the electronic device 300 may further include other components.

According to one embodiment, the input device 303 may include a microphone 303. In one embodiment, the input device 303 may include a plurality of microphones 303 arranged to sense a direction of sound. The sound output device 306 and 307 may include speakers 306 and 307. The speakers 306 and 307 may include an external speaker 306 and a phone call receiver 307. In an example embodiment, when an external speaker 306' is arranged in the first housing 310, sound may be output through a hole of speaker 306 formed in the second housing 320 in the closed state. According to one embodiment, the microphone 303 and the connector port 308 may also be formed to have substantially the same configuration. In one embodiment, the sound output devices 306 and 307 may include a speaker (e.g., a piezo speaker) that operates without a separate speaker hole 306.

According to one embodiment, the sensor modules 304 and 317 may generate an electrical signal or a data value corresponding to an internal operating state of the electronic device 300 or an external environmental state. The sensor modules 304 and 317 may include, for example, a first sensor module 304 (e.g., a proximity sensor or an illuminance sensor) disposed on a front surface of the second housing 320, and/or a second sensor module 317 (e.g., a heart rate monitoring (HRM) sensor) disposed on a rear surface of the second housing 320. According to one embodiment, the first sensor module 304 may be disposed below the flexible display 330 in the second housing 320. According to one embodiment, the first sensor module 304 may further include at least one of a proximity sensor, an illuminance sensor, a time of flight (TOF) sensor, an ultrasonic sensor, a fingerprint recognition sensor, a gesture sensor, a gyro sensor, an atmospheric pressure sensor, a magnetic sensor, an acceleration sensor, a grip sensor, a color sensor, an IR sensor, a biometric sensor, a temperature sensor, or a humidity sensor.

According to one embodiment, the camera devices 305 and 316 may include a first camera device 305 disposed on the front surface of the second housing 320 of the electronic device 300, and a second camera device 316 disposed on the rear surface of the second housing 320. According to one embodiment, the electronic device 300 may include a flash 318 located near the second camera device 316. According to one embodiment, the camera devices 305 and 316 may include one or more lenses, an image sensor, and/or an ISP. According to one embodiment, the first camera device 305 may be disposed under the flexible display 330, and may be configured to capture an object through a portion of an active area of the flexible display 330. According to one embodiment, the flash 318 may include, for example, a light-emitting diode (LED) or a xenon lamp. In one embodiment, two or more lenses (e.g., a wide-angle lens and a telephoto lens) and image sensors may be disposed on one surface of the electronic device 300.

According to one embodiment, the electronic device 300 may include at least one antenna (not shown). According to one embodiment, the at least one antenna may wirelessly communicate with an external electronic device (e.g., the electronic device 104 of FIG. 1), or may wirelessly transmit and receive power required for charging. According to one embodiment, the antenna may include a legacy antenna, a mmWave antenna, a near field communication (NFC) antenna, a wireless charging antenna, and/or a magnetic secure transmission (MST) antenna. According to one embodiment, an antenna structure may be formed through at least a portion of the first side frame 312 and/or the second side frame 322, which are formed of metal.

The electronic device according to embodiments may be one of various types of electronic devices. The electronic device may include, for example, a portable communication device (e.g., a smartphone), a computer device, a portable multimedia device, a portable medical device, a camera, a wearable device, or a home appliance device. According to one embodiment of the disclosure, the electronic device is not limited to those described above.

It should be appreciated that embodiments of the disclosure and the terms used therein are not intended to limit the technological features set forth herein to particular embodiments and include various changes, equivalents, or replacements for a corresponding embodiment. In connection with the description of the drawings, like reference numerals may be used for similar or related components. It is to be understood that a singular form of a noun corresponding to an item may include one or more of the things, unless the relevant context clearly indicates otherwise. As used herein, "A or B," "at least one of A and B," "at least one of A or B," "A, B or C," "at least one of A, B and C," and "at least one of A, B, or C," each of which may include any one of the items listed together in the corresponding one of the phrases, or all possible combinations thereof. Terms such as "1st," "2nd," or "first" or "second" may simply be used to distinguish the component from other components in question, and do not limit the components in other aspects (e.g., importance or order). It is to be understood that if an element (e.g., a first element) is referred to, with or without the term "operatively" or "communicatively," as "coupled with," "coupled to," "connected with," or "connected to" another element (e.g., a second element), it means that the element may be coupled with the other element directly (e.g., by wire), wirelessly, or via a third element.

As used in connection with embodiments of the disclosure, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to one embodiment, the module may be implemented in a form of an application-specific integrated circuit (ASIC).

Embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium and execute it. This allows the machine to be operated to perform at least one function according to the at least one instruction invoked. The one or more instructions may include code generated by a compiler or code executable by an interpreter. The machine-readable storage medium may be provided in the form of a non-transitory storage medium. Here, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to one embodiment, a method according to embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smartphones) directly. If distributed online, at least part of the computer program product may be temporarily generated or at least temporarily stored in the machine-readable storage medium, such as a memory of the manufacturer's server, a server of the application store, or a relay server.

According to embodiments, each component (e.g., a module or a program) of the above-described components may include a single entity or multiple entities, and some of the multiple entities may be separately disposed in different components. According to embodiments, one or more of the above-described components may be omitted, or one or more other components may be added. Alternatively or additionally, a plurality of components (e.g., modules or programs) may be integrated into a single component. In such a case, according to embodiments, the integrated component may still perform one or more functions of each of the plurality of components in the same or similar manner as they are performed by a corresponding one of the plurality of components before the integration. According to embodiments, operations performed by the module, the program, or another component may be carried out sequentially, in parallel, repeatedly, or heuristically, or one or more of the operations may be executed in a different order or omitted, or one or more other operations may be added.

Figure 4:
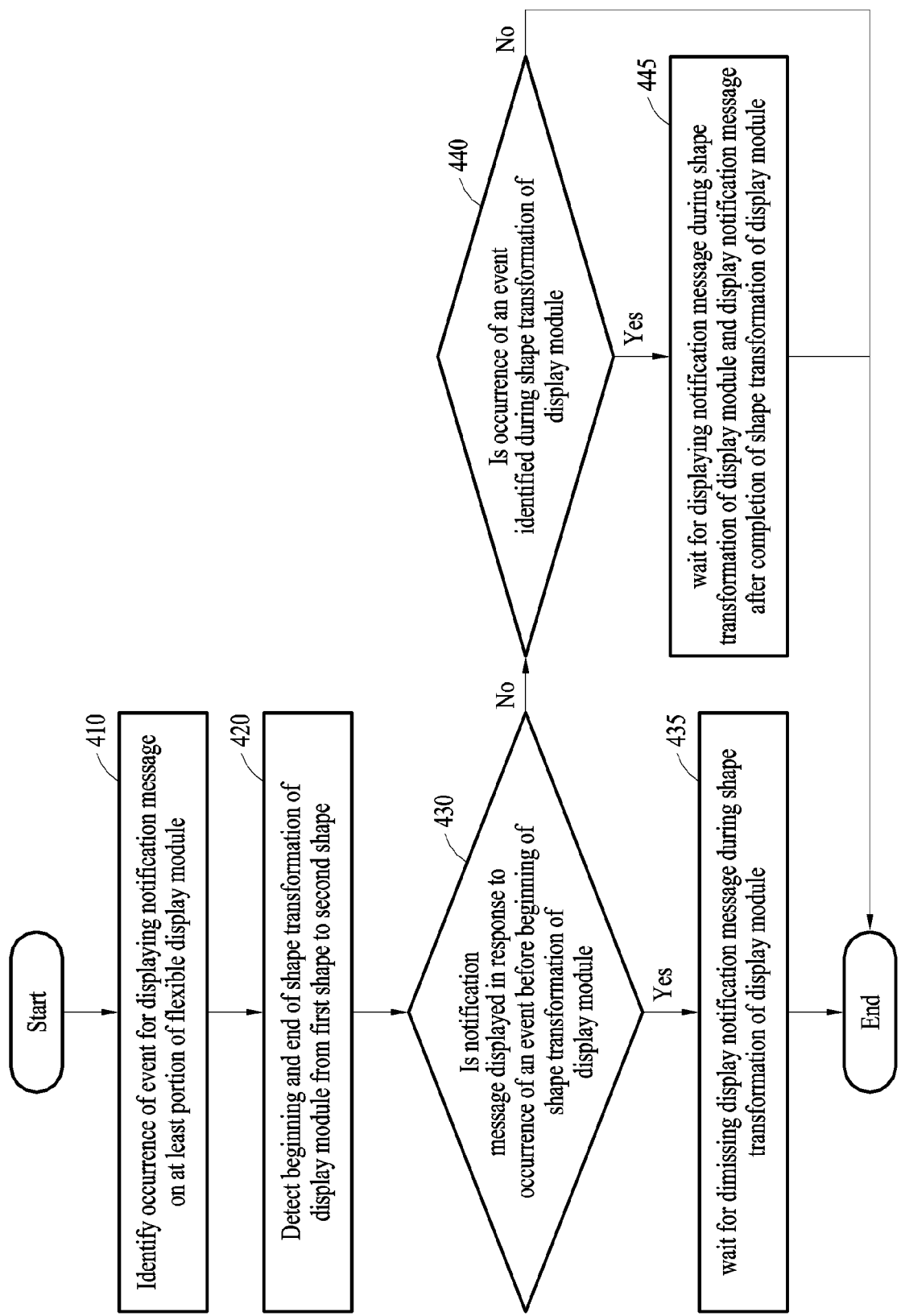
FIG. 4 is a flowchart illustrating an operation of displaying a notification message, according to one embodiment.

FIG. 4 is a flowchart illustrating an operation of displaying a notification message, according to one embodiment.

In operation 410, an electronic device (e.g., the electronic device 101 of FIG. 1) according to one embodiment may identify an occurrence of an event for displaying a notification message on at least a portion of a flexible display module.

In operation 420, the electronic device may detect the beginning and the end of shape transformation of the display module from a first shape to a second shape. For example, the electronic device may identify a time point at which the shape transformation of the display module begins and a time point at which the shape transformation of the display module ends.

In operation 430, whether the electronic device displays a notification message in response to the occurrence of an event before the beginning of shape transformation of the display module is checked.

If the electronic device displays a notification message in response to the occurrence of an event before the beginning of shape transformation of the display module, in operation 435, the electronic device may wait to dismiss displaying the notification message during the shape transformation of the display module from the first shape to the second shape. That is, the electronic device may not dismiss displaying the notification message during the shape transformation of the display module.

The electronic device according to one embodiment may be an electronic device including a flexible display module of which the shape is transformable. The electronic device including the flexible display module may include a foldable electronic device and a rollable electronic device. The shape of the display module of the electronic device may be transformed from the first shape to the second shape.

For example, the electronic device according to one embodiment may be a foldable electronic device (e.g., the electronic device 200 of FIGS. 2A to 2C) including a foldable display arranged in a space formed by a foldable housing. In this case, the first shape may represent a shape of the display module in a folded state of the electronic device, and the second shape may represent a shape of the display module in an unfolded state (e.g., a flat state) of the electronic device.

In one embodiment, the electronic device may be a rollable electronic device (e.g., the electronic device 300 of FIGS. 3A to 3D) with a display including a display screen that expands. In this case, the first shape may represent a shape of the display module before the display screen of the electronic device is transformed (i.e., one of the open state and the closed state), and the second shape may represent a shape of the display module after the display screen of the electronic device is transformed (i.e., the other of the open state and the closed state).

If the electronic device does not display a notification message in response to the occurrence of an event before the beginning of shape transformation of the display module, in operation 440, whether the electronic device identifies the occurrence of an event during the shape transformation of the display module from the first shape to the second shape is checked.

If the electronic device identifies the occurrence of an event during the shape transformation of the display module from the first shape to the second shape, in operation 445, the electronic device may wait for displaying the notification message during the shape transformation and may display the notification message after the completion of the shape transformation of the display module.

Then, the electronic device according to one embodiment may change display of the notification message into a dismissible state during a time interval including the time point at which the shape transformation of the display module ends. The time interval including a specific time point may represent a time interval starting from a preset time period before the specific time point and ending at a preset time period after the specific time point. The electronic device may change the display of the notification message into the dismissible state at a predetermined time point in the time interval including the time point at which the shape transformation of the display module ends. Although it is described below, the electronic device may change the display of the notification message into the dismissible state by executing or resuming a timer related to the display of the notification message in another embodiment. Here, the "dismissible state" may mean a state at which the timer related to the display of the notification message is operated.

Figure 5:
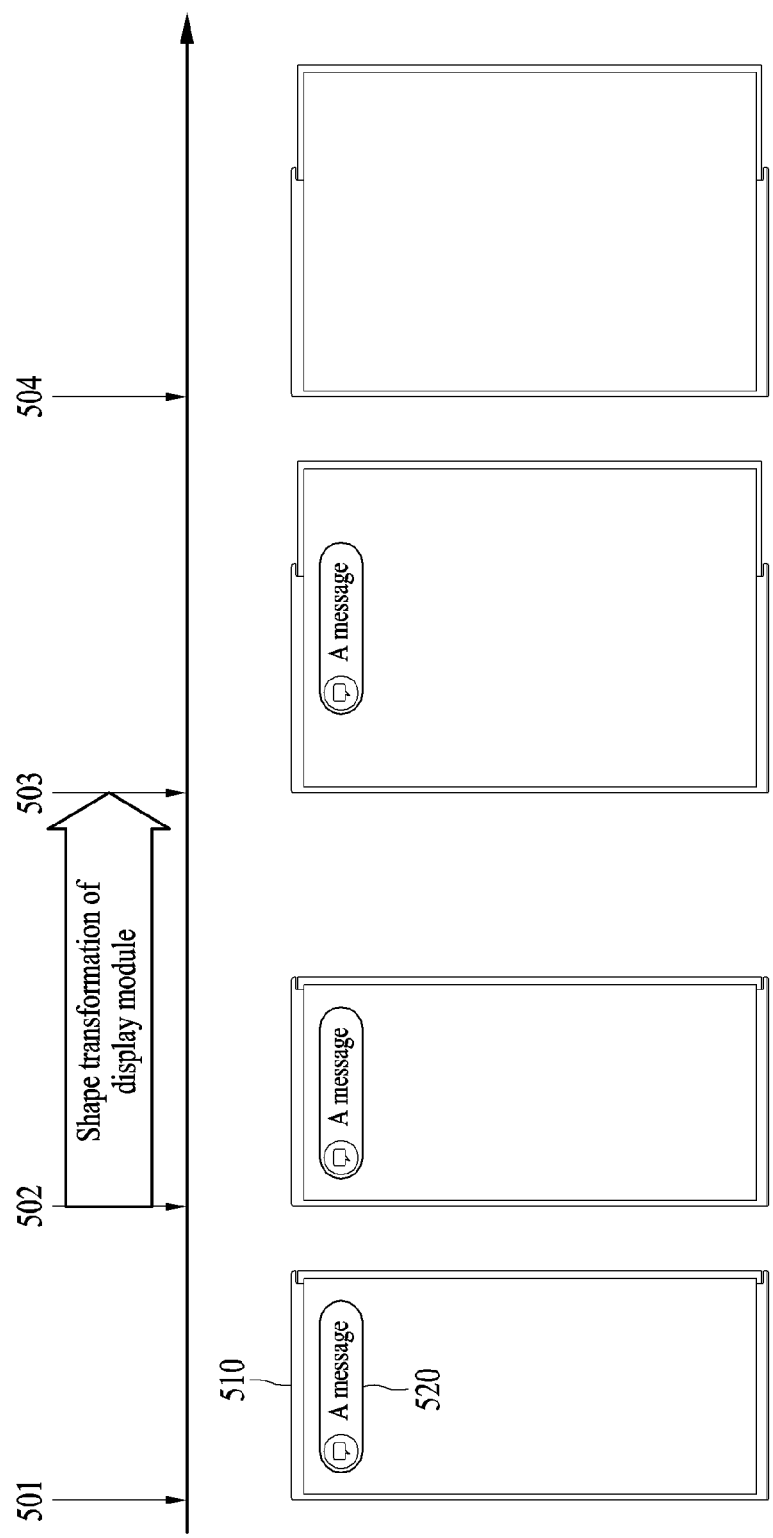
FIGS. 5 and 6 are diagrams illustrating an operation of an electronic device when a display module displays a notification message before shape transformation of the display module, according to one embodiment.
Figure 6:
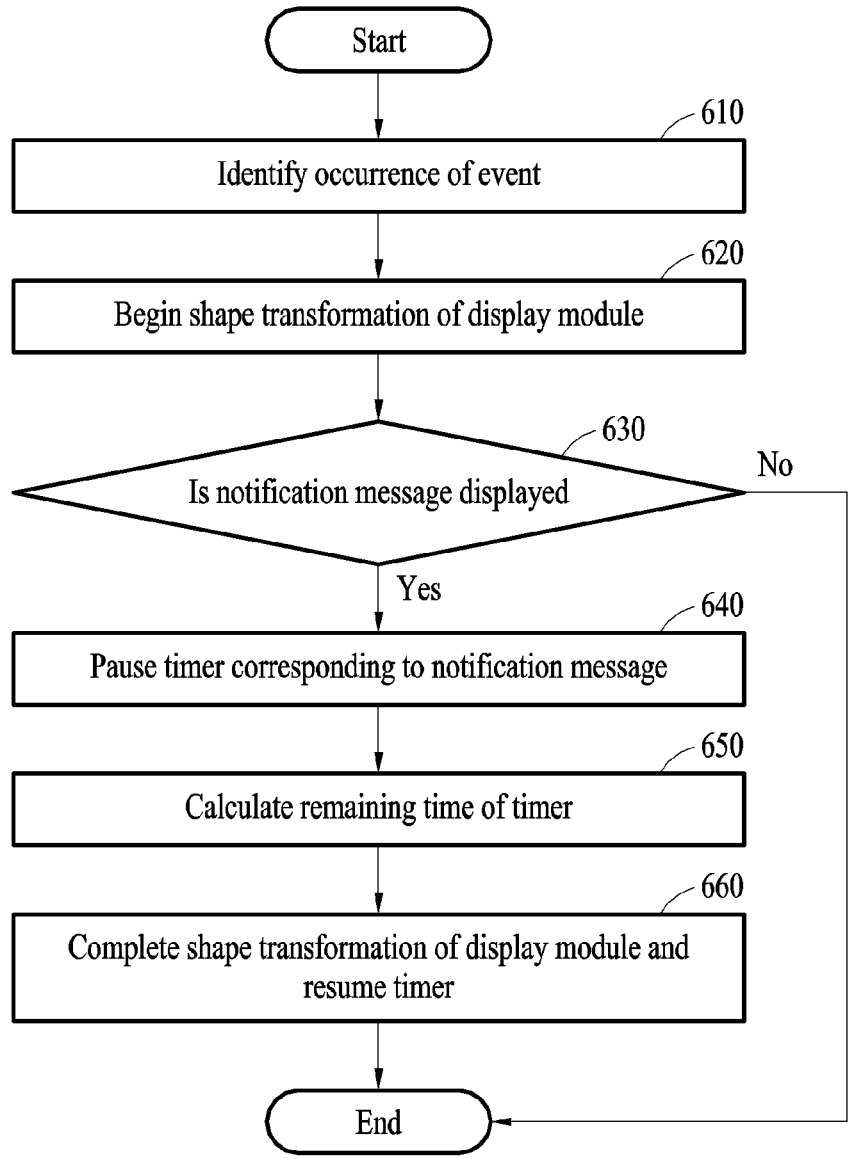

FIGS. 5 and 6 are diagrams illustrating an operation of an electronic device when a display module displays a notification message before shape transformation of the display module, according to one embodiment.

An electronic device 510 (e.g., the electronic device 101 of FIG. 1) according to one embodiment may identify an occurrence of an event for displaying a notification message before shape transformation of a display module (e.g., the display module 160 of FIG. 1) from a first shape to a second shape and may display the notification message in response to identifying the occurrence of an event. For example, in response to identifying the occurrence of an event, the electronic device 510 may display, on a screen, a notification message 520 corresponding to the identified event at a time point 501 when the occurrence of an event is identified.

For the notification message 520, the electronic device 510 may set a timer related to a display of the notification message. The electronic device 510 may control to dismiss the display of the notification message using the timer related to the display of the notification message. For example, the electronic device 510 may set the timer related to the display of the notification message 520 at the time point 501 when the occurrence of an event is identified. The timer may have a preset duration. For example, the duration of the timer may be 3 seconds, but is not limited thereto.

The electronic device 510 may display the notification message 520 while the timer corresponding to the notification message 520 is executed. The electronic device 510 may dismiss the display of the notification message 520 when the timer corresponding to the notification message 520 is terminated.

When the electronic device 510 displays the notification message 520 in response to identifying the occurrence of an event before the beginning of the shape transformation of the display module, the electronic device 510 may pause the timer corresponding to the notification message 520 in a time interval including a time point 502 when the shape transformation of the display module begins. The electronic device 510 may pause the timer corresponding to the notification message 520 at a pause time point in the time interval including the time point 502 when the shape transformation of the display module begins. For example, the electronic device 510 may pause the timer corresponding to the notification message 520 at the time point 502 at which the shape transformation of the display module begins.

The electronic device 510 may maintain the display of the notification message 520 during the shape transformation of the display module and may display the notification message 520 during a remaining time of the timer by resuming the timer that is paused in the time interval including a time point 503 at which the shape transformation of the display module ends. The electronic device 510 may detect the completion of the shape transformation of the display module into the second shape. The electronic device 510 may resume the timer related to the display of the notification message 520 at an execution time point in the time interval including the time point 503 at which the shape transformation of the display module ends. The electronic device 510 may dismiss the display of the notification message 520 at a time point 504 at which the timer related to the display of the notification message 520 ends.

Referring to FIG. 6, in operation 610, the electronic device may identify an occurrence of an event for displaying a notification message. The electronic device may display the notification message on a screen in response to identifying the occurrence of the event before the beginning of shape transformation of a display module. In this case, the electronic device may execute a timer related to the display of the notification message at a time point of displaying the notification message.

Subsequently, in operation 620, the shape of the display module of the electronic device may be transformed. The electronic device may detect the beginning of the shape transformation of the display module from the first shape to the second shape. The electronic device may display a notification message before the beginning of the shape transformation of the display module. For example, when the electronic device is a rollable electronic device, the shape of the display module may be changed by driving a motor. The size of the display screen of the display module may increase or decrease by driving a motor. When a motor starts to be driven for shape transformation of the display module, the electronic device may determine that the shape transformation of the display module begins.

In operation 630, when the shape transformation of the display module begins, the electronic device may determine whether the notification message is displayed on the screen. The electronic device may pause the timer corresponding to the notification message at a pause time point in the time interval including the time point at which the shape transformation of the display module begins. The electronic device may determine whether the notification message is displayed on the screen at the pause time point. When the display of the notification message is already dismissed as the timer corresponding to the notification message is terminated before the pause time point, the electronic device may not output the notification message after the end of the shape transformation of the display module. On the other hand, when the notification message is displayed as the timer corresponding to the notification message is executed at the pause time point, the electronic device may perform operation 640.

In operation 640, the electronic device may pause the timer corresponding to the notification message at the pause time point. The electronic device may maintain the display of the notification message even if the timer corresponding to the notification message is paused. The electronic device may activate or deactivate the notification message during the shape transformation of the display module.

In operation 650, the electronic device may calculate a remaining time of the timer corresponding to the notification message. The remaining time of the timer may represent a time subtracting an elapsed time of the timer from the duration of the timer.

In operation 660, the shape transformation of the display module of the electronic device may be completed and the electronic device may change the display of the notification message to a dismissible state at an execution time point in a time interval including a time point at which the shape transformation of the display module ends. In other words, the electronic device may resume the timer corresponding to the notification message at an execution time point. The electronic device may display the notification message during the remaining time of the timer from the execution time point and may dismiss the display of the notification message when the timer is terminated. For example, when the electronic device is a rollable electronic device, the electronic device may determine that the shape transformation of the display module is completed when driving of a motor for the shape transformation of the display module is completed.

Figure 7:
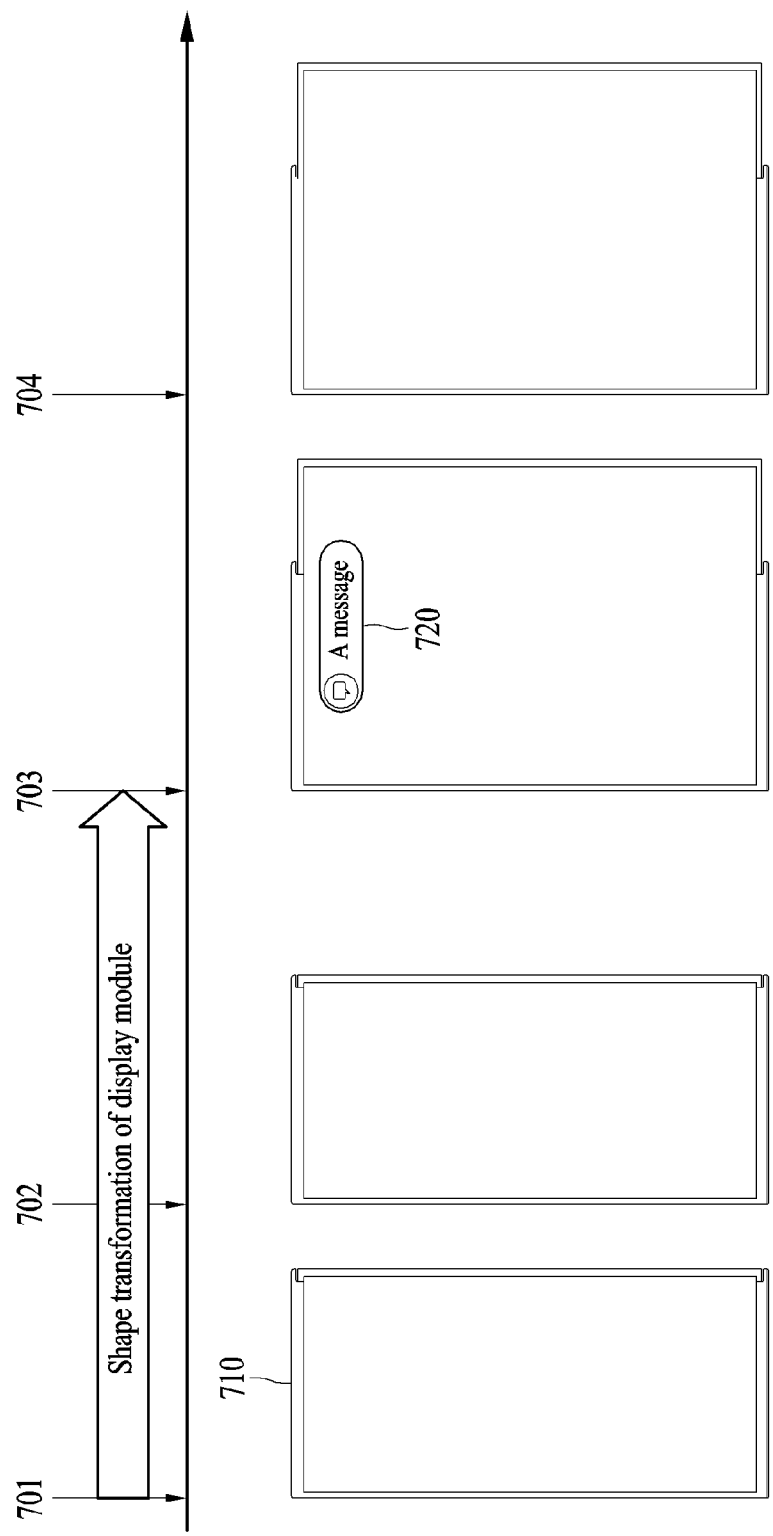
FIGS. 7 and 8 are diagrams illustrating an operation of an electronic device when an occurrence of an event is identified during shape transformation of the display module, according to one embodiment.
Figure 8:
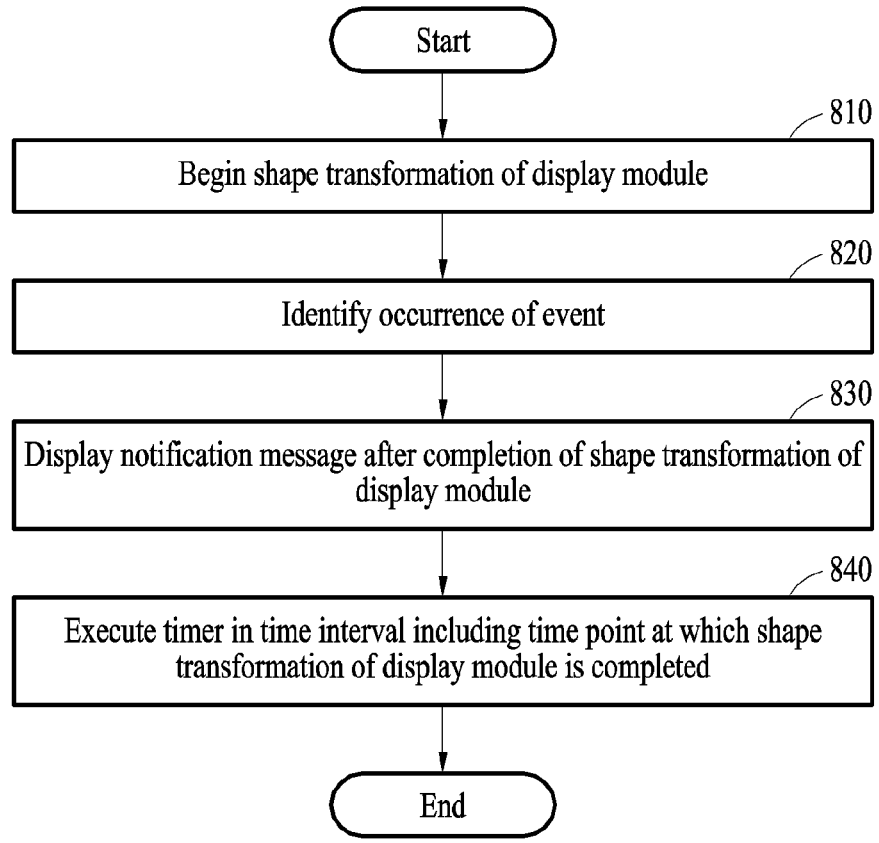

FIGS. 7 and 8 are diagrams illustrating an operation of an electronic device when an occurrence of an event is identified during shape transformation of the display module, according to one embodiment.

An electronic device 710 (e.g., the electronic device 101 of FIG. 1) according to one embodiment may identify an occurrence of an event during shape transformation of a display module (e.g., the display module 160 of FIG. 1) from a first shape to a second shape. For example, the electronic device 710 may not display the notification message before the beginning of the shape transformation of the display module (e.g., the display module 160 of FIG. 1) from the first shape to the second shape. The electronic device 710 may identify the occurrence of the event for displaying the notification message in an application at a time point 702 during the shape transformation of the display module. When the electronic device 710 identifies the occurrence of the event during the shape transformation of the display module, the electronic device 710 may wait to display the notification message 720 corresponding to the identified event. That is, the electronic device 710 may not display the notification message 720 during the shape transformation of the display module. The electronic device 710 may display the notification message 720 after the completion of the shape transformation of the display module. For example, the electronic device 710 may display the notification message 720 at a time point 703 at which the shape transformation of the display module is completed.

Referring to FIG. 8, in operation 810, shape transformation of a display module of an electronic device may begin. Subsequently, in operation 820, the electronic device may identify an occurrence of an event during the shape transformation of the display module. In other words, the electronic device may identify the occurrence of the event during the shape transformation of the display module and may not display the notification message before the beginning of the shape transformation of the display module. When the electronic device identifies the occurrence of the event during the shape transformation of the display module from the first shape to the second shape, the electronic device may wait for executing a timer related to a display of the notification message during the shape transformation of the display module.

In operation 830, the electronic device may display the notification message after the completion of the shape transformation of the display module.

In operation 840, the electronic device may execute the timer related to the display of the notification message in a time interval including a time point at which the shape transformation of the display module is completed. For example, the electronic device may execute the timer related to the display module of the notification message at a time point of displaying the notification message after the completion of the shape transformation of the display module. The electronic device may display the notification message from a time point of executing the timer during the duration of the timer and may dismiss the display of the notification message when the timer is terminated. According to one embodiment, the electronic device may delay the display of the notification message until the time point of executing the timer and may display the notification message on the screen at a time point of executing the timer.

Moreover, in one embodiment, in response to identifying the occurrence of the event during the shape transformation of the display module, the electronic device may immediately display the notification message corresponding to the identified event. For example, when the electronic device identified the occurrence of the event during the shape transformation of the display module, the electronic device may display the notification message at a time point of identifying the occurrence of the event. In this case, the electronic device may set the timer related to the display of the notification message. The electronic device may wait to execute the timer related to the display of the notification message during the shape transformation of the display module. That is, electronic device may not execute the timer related to the display of the notification message during the shape transformation of the display module. The electronic device may execute the timer corresponding to the notification message in the time interval including a time point at which the shape transformation of the display module is completed. The electronic device may execute the timer corresponding to the notification message at an execution time point in the time interval including the time point at which the shape transformation of the display module is completed. For example, the electronic device may execute the timer related to the notification message at a time point at which the shape transformation of the display module is completed. The electronic device may display the notification message from a time point of executing the timer during the duration of the timer and may dismiss the display of the notification message when the timer is terminated.

Figure 9:
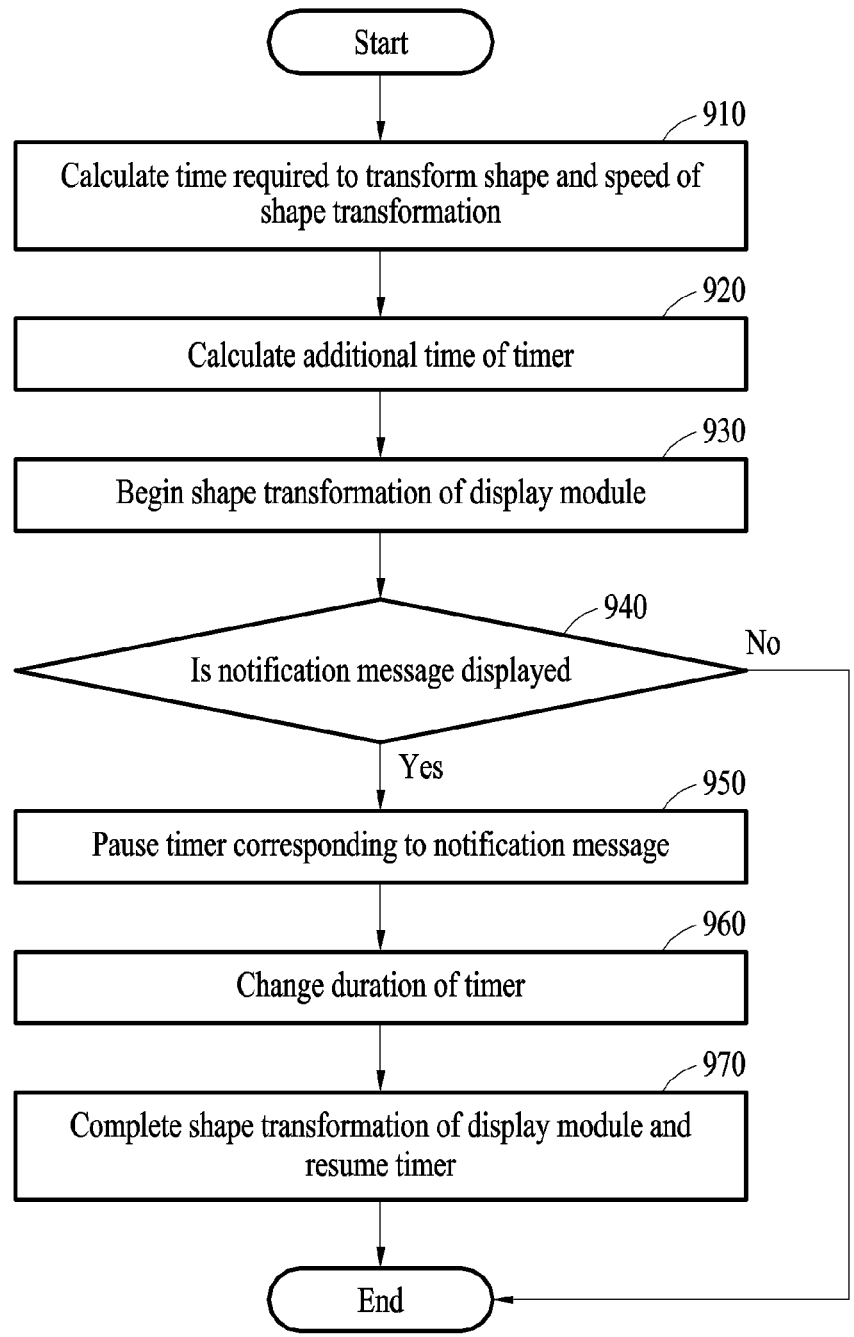
FIG. 9 is a flowchart illustrating an operation of changing a duration of a timer, according to one embodiment.

FIG. 9 is a flowchart illustrating an operation of changing a duration of a timer, according to one embodiment.

The speed of shape transformation of the display module and a time duration to transform the shape of the display module may vary depending on the electronic device. For example, usability of a user may be degraded when the speed of shape transformation of the display module is slow or a notification message is displayed on a screen for a time longer than necessary as the time duration to transform the shape of the display module increases. The electronic device according to one embodiment may change the duration of the timer related to the display of the notification message by considering at least one of the speed of the shape transformation of the display module and the current time duration to transform the shape of the display module.

In one embodiment, the electronic device may determine the speed of shape transformation of the display module and the degree of shape transformation of the display module, based on a cause of shape transformation of the display module.

For example, when the electronic device is a rollable electronic device, the first shape may represent a shape of the display module before the display screen of the electronic device is transformed (i.e., one of the open state and the closed state), and the second shape may represent a shape of the display module after the display screen of the electronic device is transformed (i.e., the other of the open state and the closed state). In addition, the speed of shape transformation of the display module may represent a driving speed of a motor for changing the size of the display screen, and the degree of the shape transformation of the display module may represent the expanded or reduced size of the display screen after the shape transformation.

The electronic device may change the shape of display module, based on an external factor other than content to be displayed on the screen. For example, the electronic device may reduce the display screen based on drop detection of the electronic device. The electronic device may reduce the display screen to be in a minimum size and may drive a motor at a first speed that is the fastest speed. When the electronic device detects a drop of the electronic device, the electronic device may reduce the display screen by driving the motor at the fastest speed for preventing collision or damage of the electronic device. In one embodiment, in response to a failure to receive a user input as a predetermined time has elapsed, the electronic device may determine that the electronic device is not in use and may reduce the display screen. The electronic device may reduce the display screen to be in a minimum size and may drive the motor at a second speed that is slower than the first speed. Since the electronic device has priority in preventing collision and damage of the electronic device, the electronic device may not need to rapidly drive the motor in reducing the display screen to be in the minimum size when determining that the electronic device is not in use. In one embodiment, when the electronic device executes an application for outputting image content, such as a gallery, a video call, and a video player, the electronic device may transform the shape of the display module, based on output image content. The electronic device may determine the size of the display screen to be changed based on a ratio of the image content. The electronic device may change the size of the display screen such that the ratio of the image content corresponds to a ratio of the display screen. The ratio of the image content may represent a ratio of a vertical length to a horizontal length of an image. In one embodiment, when the electronic device executes an application for outputting text content, such as a message and a post, the electronic device may change the shape of the display module based on the output text content. The electronic device may expand the display screen to be in the maximum size. When the electronic device changes the shape of the display module based on content (e.g., image content or text content), the electronic device may drive the motor at a third speed that is slower than the first speed and faster than the second speed. During the shape transformation of the display module based on the content, there is no need to drive the motor at a low speed, such as the second speed, since the electronic device does not need to be controlled much. When driving the motor at a fast speed, the user may have a difficulty in gripping the electronic device, and thus, the electronic device may drive the motor at the third speed that is slower than the first speed and faster than the second speed.

The electronic device (e.g., the electronic device 101 of FIG. 1) according to one embodiment may change a duration of a timer.

In one embodiment, the electronic device may change the duration of the timer corresponding to a notification message, based on a time duration to transform the shape of the display module. Firstly, the electronic device may calculate a time interval from the beginning of the shape transformation of the display module to the end of the shape transformation of the display module. The calculated time interval may represent the time duration to transform the shape of the display module. The electronic device may change the duration of the timer corresponding to the notification message, based on the time duration to transform the shape of the display module. For example, the electronic device may increase the duration of the timer corresponding to the notification message by adding the time required to transform the shape of the display module to an initial duration of the timer corresponding to the notification message. For example, the electronic device may basically set the initial duration of the timer corresponding to the notification message to be short and may prolong the display duration of the notification message on the screen by the amount of the time required to transform the shape of the display module by increasing the set duration of the timer by the time required to transform the shape of the display module.

In one embodiment, the electronic device may change the duration of the timer by additionally considering the speed of shape transformation of the display module. The electronic device may change the duration of the timer corresponding to the notification message based on a calculated time by applying a weight corresponding to the speed of shape transformation of the display module to a target time interval. For example, the electronic device may increase the duration of the timer corresponding to the notification message by adding, to an initial duration of the timer corresponding to the notification message, the time calculated by applying the weight corresponding to the speed of shape transformation of the display module to the initial time duration to transform the shape of the display module. The weight corresponding to the speed of shape transformation of the display module may increase as the speed of shape transformation of the display module increases. For example, a weight of 1 may be assigned to the first speed (e.g., high speed), a weight of 0.2 may be assigned to the second speed (e.g., low speed), and a weight of 0.7 may be assigned to the third speed (e.g., middle speed). In other words, when the speed of shape transformation of the display module is low, the electronic device may increase the duration of the timer corresponding to the notification message by a small amount even if the remaining time duration to transform the shape of the display module is the same as a case in which the speed of shape transformation of the display module is high.

FIG. 9 is a flowchart illustrating an operation of changing a duration of a timer corresponding to a notification message that is displayed before the beginning of shape transformation of a display module.

In operation 910, the electronic device may calculate a time duration to transform the shape of the display module and a speed of shape transformation of the display module. For example, when the electronic device is a rollable electronic device, the speed of shape transformation of the display module may represent a driving speed of a motor. The electronic device may calculate the time duration to transform the shape of the display module, based on a target moving distance of the display screen and a driving speed of the motor. The electronic device may calculate the time duration to transform the shape of the display module as the time calculated by dividing the target moving distance by the driving speed of the motor.

In operation 920, the electronic device may calculate additional time of the timer corresponding to the notification message. The electronic device may calculate additional time of the timer corresponding to the notification message. Here, the additional time of the timer may represent a time to be added to a present duration of the timer, based on the shape transformation of the display module. For example, the additional time of the timer may be the time duration to transform the shape of the display module. In one embodiment, the additional time of the timer may be the time calculated by applying a weight corresponding to the speed of shape transformation of the display module to the time duration to transform the shape of the display module.

In operation 930, the shape transformation of the display module of the electronic device may begin. In operation 940, when the shape transformation of the display module begins, the electronic device may determine whether the notification message is displayed on the screen. For example, operation 940 may be the same as operation 630 of FIG. 6.

In operation 950, the electronic device may pause the timer corresponding to the notification message. In operation 960, the electronic device may change the duration of the timer corresponding to the notification message. The electronic device may change the duration of the timer by adding the additional time to the present duration of the timer. For example, when the duration of the timer increases by the additional time, the remaining time of the timer may increase by the additional time.

In operation 970, the shape transformation of the display module of the electronic device may be completed and the timer corresponding to the notification message may resume at an execution time point in the time interval including the time point at which the shape transformation of the display module is completed. The electronic device may display the notification message during the remaining time of the timer from the execution time point and may dismiss the display of the notification message when the timer is terminated.

In one embodiment, the electronic device may adjust the duration of the timer corresponding to the notification message in a preset unit, based on a user input. Here, the preset unit may be a unit of seconds or percentage. The electronic device may increase or decrease the duration of the timer corresponding to the notification message by the unit of seconds or percentage, based on a user input. For example, the electronic device may increase the duration of the timer by one second based on the user input. In one embodiment, the electronic device may increase the duration of the timer by 10% based on the user input.

Figure 10:
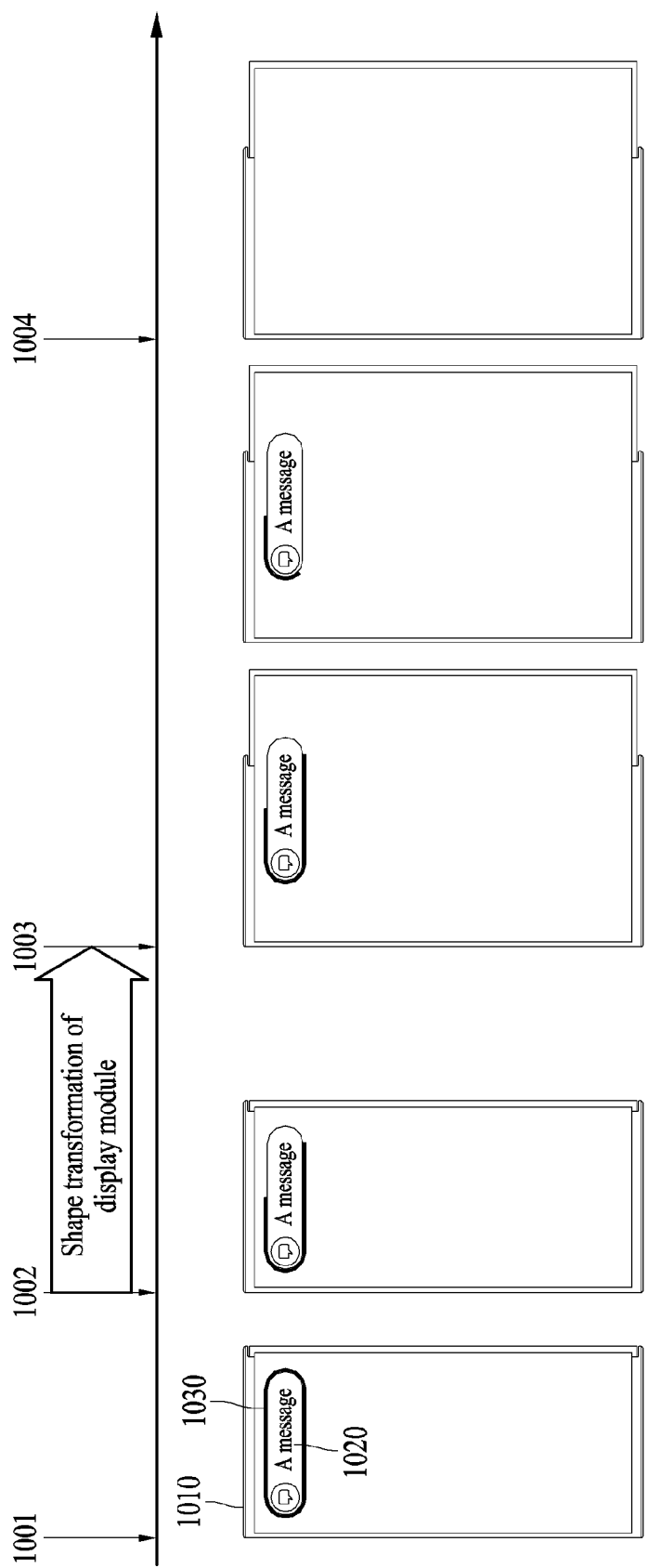
FIGS. 10, 11A, and 11B are diagrams illustrating an operation of displaying a graphic effect for a notification message, according to one embodiment.
Figure 11A:
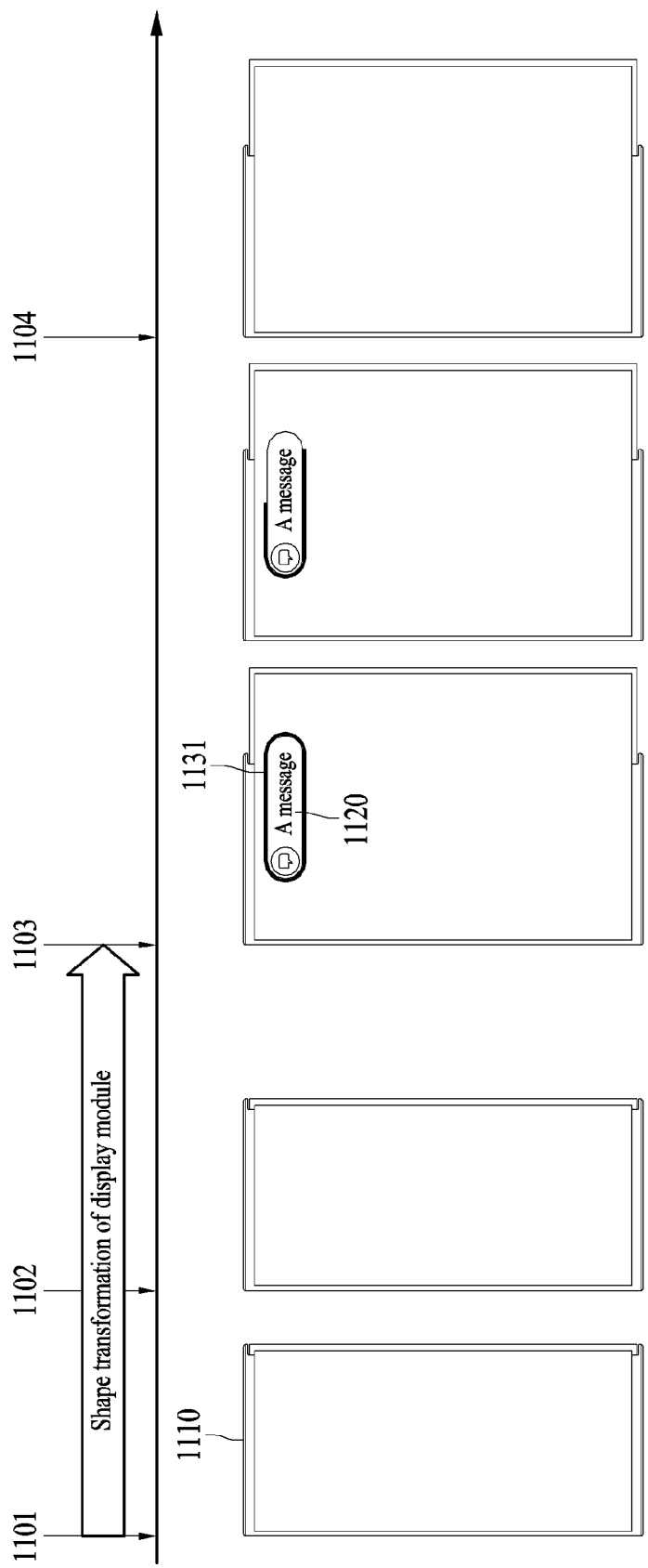
Figure 11B:
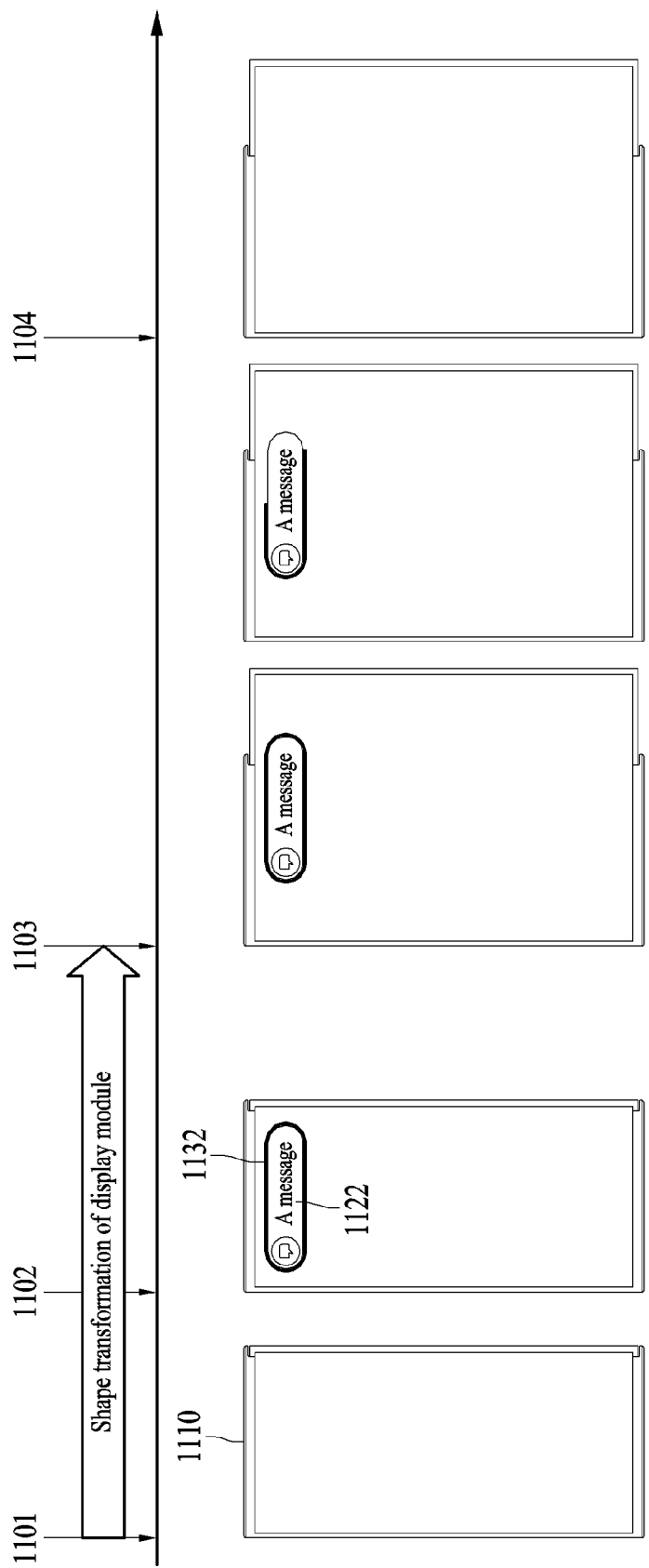

FIGS. 10, 11A, and 11B are diagrams illustrating an operation of displaying a graphic effect for a notification message, according to one embodiment.

In one embodiment, an electronic device 1010 (e.g., the electronic device 101 of FIG. 1) may display a graphic effect reflecting a change in a remaining time of a timer related to a display of a notification message 1020 while the notification message 1020 is displayed on a screen. For example, displaying the graphic effect may represent changing a color, brightness, or shape of a graphic object output on the screen and displaying the graphic object.

Referring to FIG. 10, the electronic device 1010 according to one embodiment may identify an occurrence of an event at a time point 1001 before the beginning of shape transformation of the display module and may display the notification message 1020 corresponding to the identified event on the screen. The electronic device 1010 may display a graphic object 1030 corresponding to the notification message 1020 while displaying the notification message 1020.

The electronic device 1010 may execute a timer corresponding to the notification message 1020. When the electronic device 1010 executes the timer corresponding to the notification message 1020, the electronic device 1010 may calculate a remaining time of the timer in real-time. The electronic device 1010 may display a graphic object 1030 having a shape changing based on the remaining time of the timer simultaneously with the execution of the timer. For example, when the electronic device 1010 displays the notification message 1020, the electronic device 1010 may display, with the notification message 1020, the graphic object 1030 surrounding the notification message 1020 and having a predetermined area. The electronic device 1010 may calculate a ratio of the remaining time of the timer to the total duration of the timer corresponding to the notification message 1020. The electronic device 1010 may display the graphic object 1030 based on a calculated ratio. For example, the electronic device 1010 may determine the shape of the graphic object 1030 such that a ratio of a length in which a current graphic object 1030 contacts the notification message 1020 to the total circumference of the notification message 1020 corresponds to the ratio of the remaining time of the timer to the total duration of the timer. That is, the shape of the graphic object 1030 may change so that a ratio of a current length of the current graphic object 1030 to a total length of the graphic object 1030 corresponds to the ratio of the remaining time of the timer to the total duration of the timer.

For example, the electronic device 1010 may execute the timer corresponding to the notification message 1020 at the time point 1001 of identifying the occurrence of the event. Because at the starting time point of executing the timer, the remaining time of the timer is the same as the duration of the timer, the electronic device 1010 may display the graphic object 1030 such that the graphic object 1030 contacts the notification message 1020 on the total circumference of the notification message 1020. That is, the current length of the current graphic object 1030 at the starting time point of executing the timer may be the same as the total length of the graphic object 1030.

In addition, the electronic device 1010 may display the graphic object 1030 without changing the shape of the graphic object 1030 from the time point of pausing the timer corresponding to the notification message 1020 in a time interval from the time point 1002 of the beginning of shape transformation of the display module to the time point 1003 of resuming the timer corresponding to the notification message 1020. Here, the time point 1003 is in a time interval including a time point 1003 of the end of shape transformation of the display module. For example, the graphic object 1030 may have a shape based on the remaining time of the timer at the time point of pausing the timer during the shape transformation. In addition, from the time point of resuming the timer, the electronic device 1010 may display the graphic object 1030 by changing the shape of the graphic object 1030 in real-time such that the graphic object 1030 has a shape based on the remaining time of the timer that changes in real-time. At a time point 1004 when the timer is terminated, the electronic device 1010 may dismiss the display of the notification message 1020 and the display of the graphic object 1030.

Referring to FIG. 11A, an electronic device 1110 (e.g., the electronic device 101 of FIG. 1) may identify an occurrence of an event at a time point 1102 after the beginning 1101 of shape transformation of a display module. The electronic device 1110 may wait to display a notification message 1120 corresponding to the occurred event during the shape transformation of the display module (i.e., may not display the notification message 1120 during the shape transformation of the display module) and may display the notification message 1120 after the completion of the shape transformation of the display module. The electronic device 1110 may display a graphic object 1131 corresponding to the notification message 1120 while displaying the notification message 1120 on the screen. In addition, the electronic device 1110 may execute a timer corresponding to the notification message 1120 in a time interval including a time point at which shape transformation of the display module is completed. From the starting time point 1103 of executing the timer, the electronic device 1110 may display the graphic object 1131 by changing the shape of the graphic object 1131 in real-time such that the graphic object 1131 has the shape based on the remaining time of the timer that changes in real-time. At a time point 1104 at which the timer is terminated, the electronic device 1110 may dismiss the display of the notification message 1120 and the display of the graphic object 1131.

Furthermore, referring to FIG. 11B, when the electronic device 1110 (e.g., the electronic device 101 of FIG. 1) according to one embodiment identifies the occurrence of the event at the time point 1102 after the beginning 1101 of shape transformation of the display module, the electronic device 1110 may display a notification message 1122 corresponding to the event identified at the time point 1102 at which the occurrence of the event is identified. The electronic device 1110 may display the graphic object 1132 corresponding to the notification message 1122 while displaying the notification message 1122 on the screen. The electronic device 1110 may wait to execute a timer corresponding to the notification message 1122 during shape transformation of the display module (i.e., may not execute the timer during the shape transformation) and may execute the timer corresponding to the notification message 1122 in a time interval including a time point 1103 at which the shape transformation of the display module is completed. In addition, the electronic device 1110 may display the graphic object 1132 without changing the shape of the graphic object 1132 from the time point 1102 of identifying the occurrence of the event to an execution time point at which the timer corresponding to the notification message 1122 is executed in the time interval including a time point 1103 at which the shape transformation of the display module is completed. For example, since the electronic device 1110 waits to execute the timer corresponding to the notification message 1122 during the shape transformation of the display module (i.e., may not execute the timer during the shape transformation), the remaining time of the timer is maintained to be the total duration of the timer before the timer is executed. Accordingly, the electronic device 1110 may display the graphic object 1132 such that the notification message 1122 contacts the graphic object 1132 on the total circumference of the notification message 1122 in a time interval including the time point 1102 and the time point 1103. In addition, the electronic device 1110 may execute the timer corresponding to the notification message 1122 in the time interval including a time point 1103 at which the shape transformation of the display module is completed. From the time point of executing the timer, the electronic device 1110 may display the graphic object 1132 by changing the shape of the graphic object 1132 in real-time such that the graphic object 1132 has the shape based on the remaining time of the timer that changes in real-time.

Figure 12:
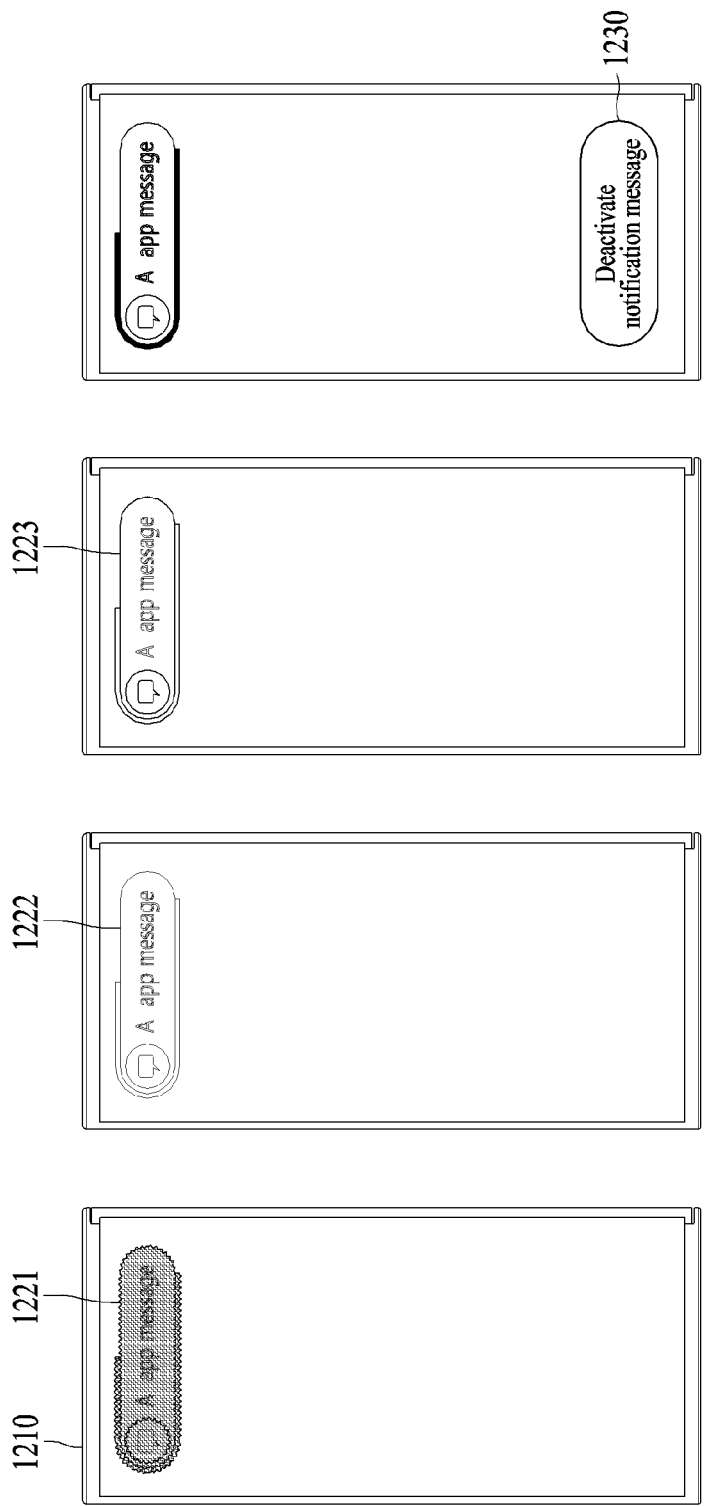
FIG. 12 is a diagram illustrating deactivation of a notification message according to one embodiment.

FIG. 12 is a diagram illustrating deactivation of a notification message according to one embodiment.

When an electronic device 1210 (e.g., the electronic device 101 of FIG. 1) according to one embodiment displays a notification message in response to identifying an occurrence of an event before the beginning of shape transformation of a display module, the electronic device 1210 may deactivate the notification message during the shape transformation of the display module. In other words, the electronic device 1210 may deactivate the notification message by blocking a user input to select the notification message during the shape transformation of the display module. When the user selects the notification message displayed on the screen during the shape transformation of the display module, the user may unstably grip the electronic device 1210, and thus, there is a risk that the electronic device 1210 may be dropped. Deactivating the notification message may represent that an application corresponding to the notification message is not executed by blocking a user input to select the notification message. Activating the notification message may represent that an application corresponding to the notification message is executed by allowing a user input to select the notification message.

The electronic device 1210 may perform various operations for notifying that the notification message is deactivated. Based on deactivation of the notification message, the electronic device 1210 may perform at least one operation of displaying an additional graphic object for notifying deactivation of the notification message and changing at least one of a graphic effect, transparency, brightness, and color of the notification message. For example, as illustrated in FIG. 12, the electronic device 1210 may dim a notification message 1221 based on deactivation of the notification message. The term "dim" may represent blurring the notification message or displaying the notification message by decreasing the saturation (i.e., chroma) of the notification message. In one embodiment, the electronic device 1210 may display the notification message 1222 by increasing the transparency or decrease the brightness of the notification message 1222, based on deactivation of the notification message. In one embodiment, the electronic device 1210 may display the notification message 1223 by changing the color of a notification message 1223 in grayscale, based on deactivation of the notification message. The electronic device 1210 may change, together with the notification message, at least one of a graphic effect, transparency, brightness, and color of a graphic object (e.g., the graphic object 1130 of FIG. 11) having a shape based on the remaining time of the timer related to the display of the notification message. In one embodiment, the electronic device 1210 may display an additional graphic object 1230 including text for indicating deactivation of the notification message, based on deactivation of the notification message.

Figure 13:
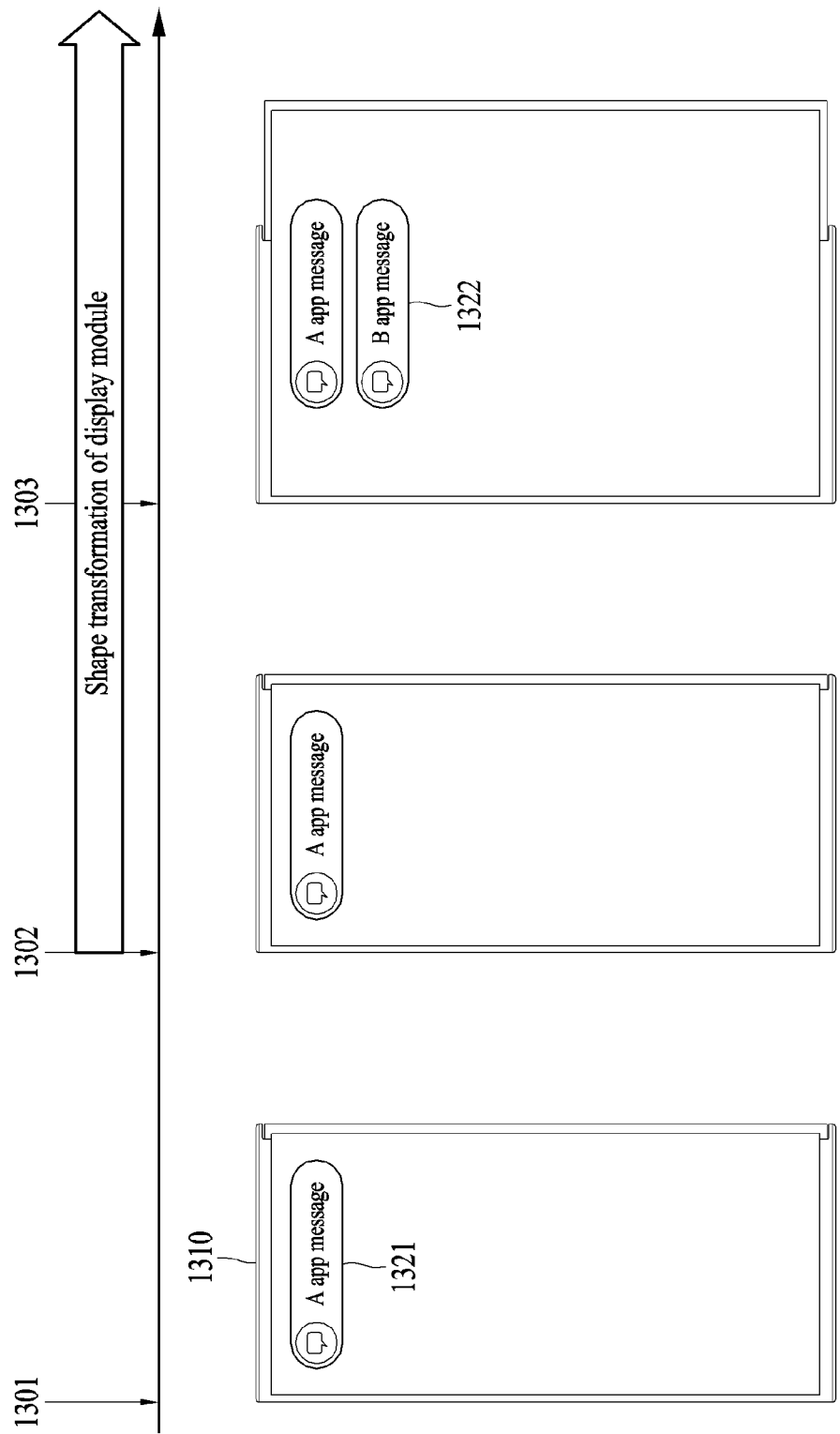
FIG. 13 is a diagram illustrating a process of displaying a plurality of notification messages according to one embodiment.

FIG. 13 is a diagram illustrating a process of displaying a plurality of notification messages according to one embodiment.

An electronic device 1310 (e.g., the electronic device 101 of FIG. 1) according to one embodiment may display a plurality of notification messages during shape transformation of a display module. For example, the electronic device 1310 may individually display the plurality of notification messages such that the notification messages do not overlap with each other. In one embodiment, the electronic device 1310 may display the plurality of notification messages to partially overlap with each other.

Referring to FIG. 13, the electronic device 1310 may identify an event that occurred in a first application (e.g., A application) at a time point 1301 before the beginning of the shape transformation of the display module. The electronic device 1310 may display, on the screen, a first notification message 1321 corresponding to the event that occurred in the first application. In one embodiment, the electronic device 1310 may display the first notification message 1321 in response to identifying the occurrence of the event before the beginning of the shape transformation of the display module. When the electronic device 1310 identifies an occurrence 1303 of an event for displaying a notification message in an application (e.g., B application) different from the first application of the first notification message 1321 during the shape transformation of the display module, the electronic device 1310 may additionally display another notification message 1322 corresponding to the event identified in the different application while maintaining the display of the first notification message 1321.

The electronic device 1310 may identify an occurrence of an event for displaying a notification message in a second application (e.g., B application) different from the first application at a time point 1303 after the beginning of the shape transformation of the display module. The electronic device 1310 may display the second notification message 1322 corresponding to the event identified in the second application. The electronic device 1310 may additionally display the second notification message 1322 while maintaining the display of the first notification message 1321.

Since the user may have a difficulty in identifying the notification message displayed on the screen during the shape transformation of the display module of the electronic device 1310, the electronic device 1310 may display a plurality of notification messages 1321 and 1322 during the shape transformation of the display module. The electronic device 1310 may display, on the screen, one notification message for each application. For example, when a plurality of events is identified in one application, the electronic device 1310 may display, on the screen, only a notification message corresponding to the most recently identified event.

The electronic device 1310 may display up to one notification message before the beginning of the shape transformation of the display module. For example, before the beginning of the shape transformation of the display module, the electronic device 1310 may dismiss the display of the notification message that is currently displayed on the screen and may display another notification message. In addition, when the electronic device 1310 displays a plurality of notification messages at a time point of the end of shape transformation of the display module, the electronic device 1310 may display up to one notification message from a time point at which only one notification message is displayed on the screen as the other notification messages are dismissed.

Furthermore, as the electronic device 1310 displays the plurality of notification messages, the electronic device 1310 according to one embodiment may individually manipulate timers related to the display of the plurality of notification messages. For example, as illustrated in FIG. 13, the electronic device 1310 may display the first notification message 1321 before the beginning of the shape transformation of the display module and may display the second notification message 1322 during the shape transformation of the display module. The electronic device 1310 may execute a first timer for controlling dismissal of the display of the first notification message 1321 at a time point 1301 of displaying the first notification message 1321. The electronic device 1310 may pause the first timer corresponding to the first notification message 1321 at a pause time point in the time interval including the time point 1302 at which the shape transformation of the display module begins. The electronic device 1310 may set a second timer for controlling dismissal of the display of the second notification message 1322 at a time point 1303 of displaying the second notification message 1322. However, the electronic device 1310 may wait to execute the second timer during the shape transformation of the display module. That is, the electronic device 1310 may not execute the second timer during the shape transformation of the display module. The electronic device 1310 may resume the paused first timer and may execute the second timer at an execution point in the time interval including a time point at which the shape transformation of the display module is completed. The electronic device 1310 may display the first notification message 1321 during the remaining time of the first timer and may display the second notification message 1322 during the duration of the second timer.

Figure 14:
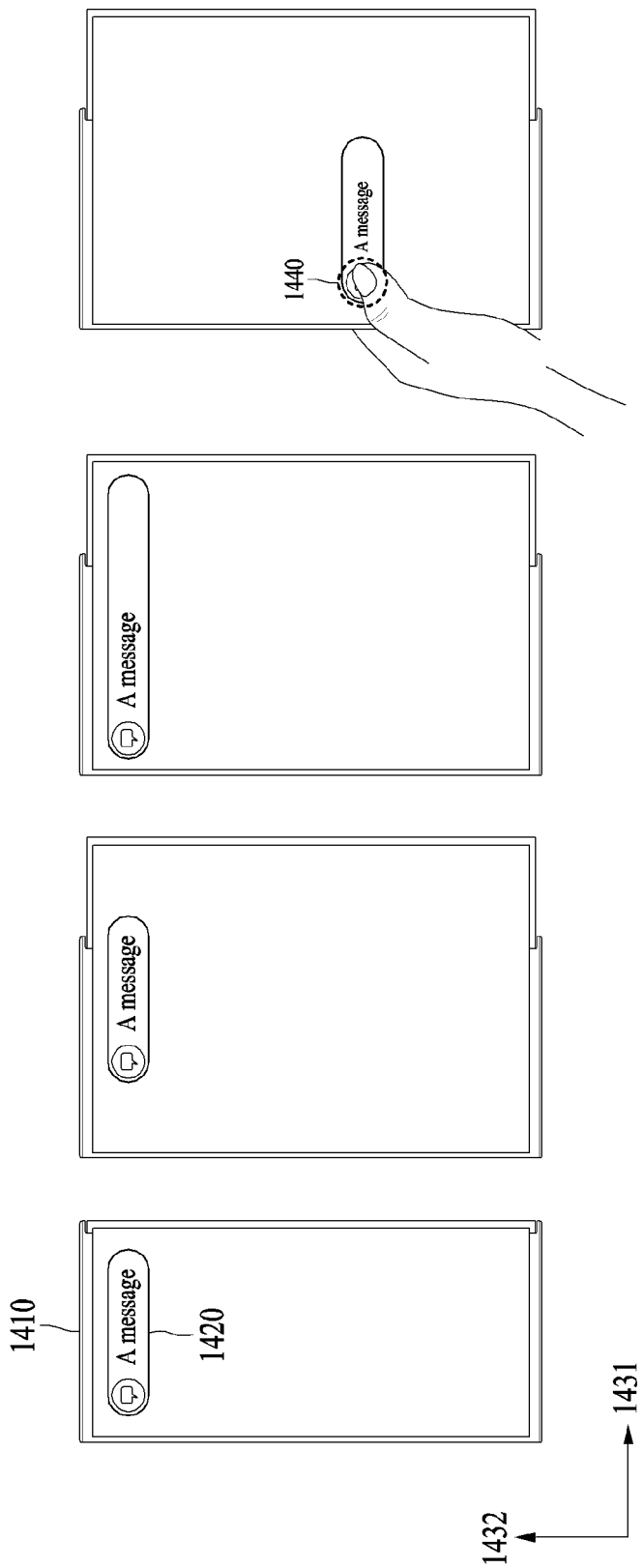
FIG. 14 is a diagram illustrating changing a position or a shape of a notification message according to one embodiment.

FIG. 14 is a diagram illustrating changing a position or a shape of a notification message according to one embodiment.

An electronic device 1410 (e.g., the electronic device 101 of FIG. 1) according to one embodiment may change at least one of a position and a shape of a notification message 1420 displayed on a screen, based on shape transformation of a display module.

The electronic device 1410 may change a position where the notification message 1420 is displayed, based on the shape transformation of the display module. The electronic device 1410 may move the notification message 1420 based on the changed display screen according to the shape transformation of the display module. For example, when the display screen of the electronic device 1410 expands along a first axis 1431, the electronic device 1410 may move the notification message 1420 along the first axis 1431 based on the display screen. The first axis may represent an axis parallel with a direction in which the display screen of the electronic device 1410 expands. The electronic device 1410 may move the notification message 1420 along the first axis 1431 such that the center of the notification message 1420 on the first axis 1431 coincides with the center of the changed display screen on the first axis 1431. In other words, the electronic device 1410 may display the notification message 1420 by aligning the notification message 1420 with the center of the changed display screen.

The electronic device 1410 may change the shape of the notification message 1420 based on the shape transformation of the display module. The electronic device 1410 may expand or reduce the notification message 1420 based on the changed display screen according to the shape transformation of the display module. For example, when the display screen of the electronic device 1410 expands along the first axis 1431, the electronic device 1410 may expand the notification message 1420 along the first axis 1431 based on the display screen. The electronic device 1410 may extend the length of the notification message 1420 in the first axis 1431 by an extended distance of the display screen in the first axis 1431.

Furthermore, the electronic device 1410 may change the position where the notification message 1420 is displayed, based on a user input. For example, when the electronic device 1410 receives a user input for changing a display position of the notification message 1420, the electronic device 1410 may change the position where the notification message 1420 is displayed. The electronic device 1410 may receive a user input that touches or clicks a target area 1440 of the full screen area of the electronic device 1410. The electronic device 1410 may move a notification message 1420 along a second axis 1432 such that the center of the notification message 1420 on the second axis 1432 coincides with the center of the target area 1440 on the second axis 1432. The second axis 1432 may be an axis orthogonal to the first axis 1431 and may represent an axis parallel with the vertical direction when the electronic device 1410 is set to the portrait mode.

Figure 15:
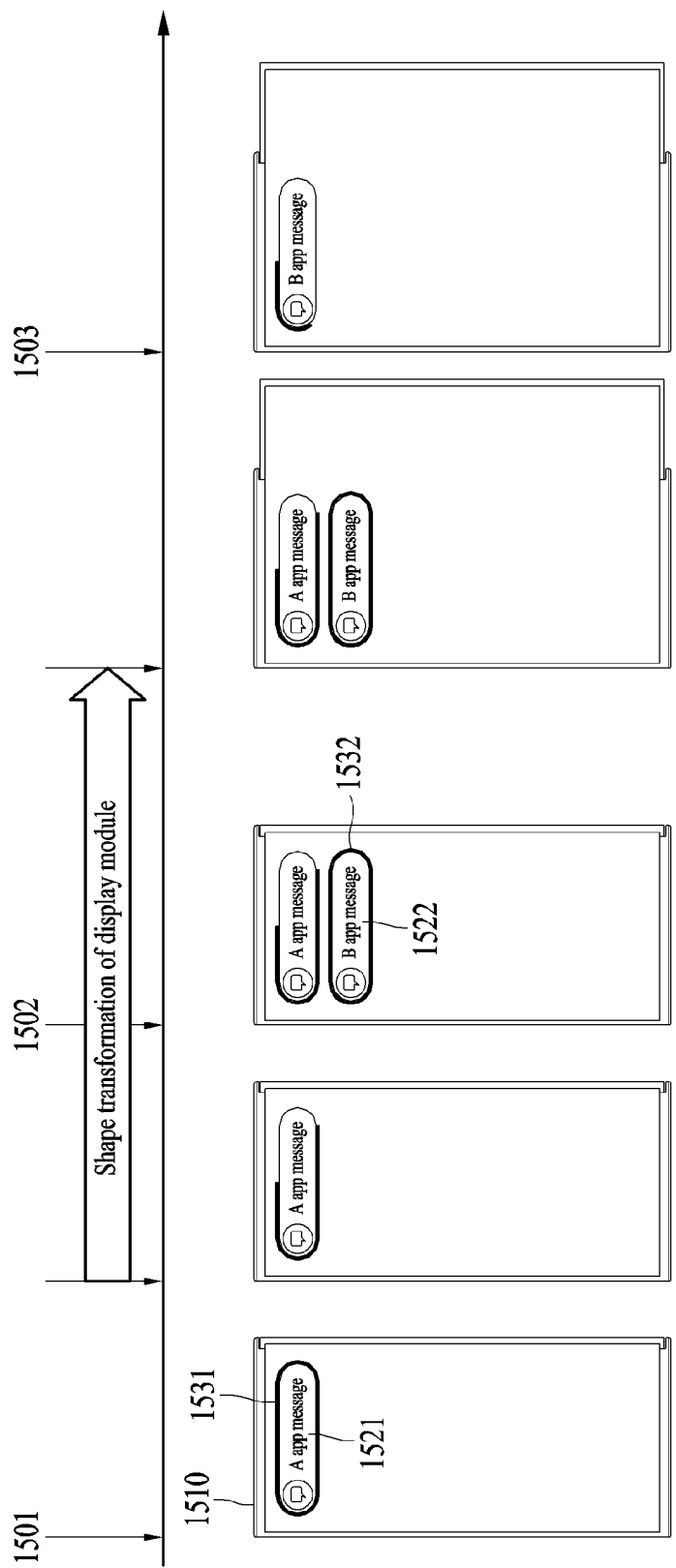
FIG. 15 is a diagram illustrating an operation of displaying a graphic effect for each notification message, according to one embodiment.

FIG. 15 is a diagram illustrating an operation of displaying a graphic effect for each notification message, according to one embodiment.

An electronic device 1510 (e.g., the electronic device 101 of FIG. 1) according to one embodiment may display a graphic effect reflecting a change in a remaining time of a timer for each notification message. Referring to FIG. 15, the electronic device 1510 may identify an occurrence of an event in a first application (e.g., A application) at a time point 1501 before the beginning of shape transformation of a display module and may display, on a screen, a first notification message 1521 corresponding to the identified event. The electronic device 1510 may execute a timer related to the display of the first notification message 1521 while displaying the first notification message 1521. The electronic device 1510 may display, together with the first notification message 1521, a graphic object 1531 having a shape based on the remaining time of the timer related to the display of the first notification message 1521. The electronic device 1510 may identify an occurrence of an event in a second application (e.g., B application) during the shape transformation of the display module. The electronic device 1510 may identify the occurrence of the event in the second application at a time point 1502 after the beginning of the shape transformation of the display module. The electronic device 1510 may display, on the screen, a second notification message 1522 corresponding to the event that occurred in the second application. The electronic device 1510 may set a timer related to the display of the second notification message 1522 while displaying the second notification message 1522 on the screen. The electronic device 1510 may display, together with the second notification message 1522, a graphic object 1532 having a shape based on the remaining time of the timer related to the display of the second notification message 1522.

In summary, the graphic object 1531 displayed with the first notification message 1521 may have a shape based on the remaining time of the timer related to the display of the first notification message 1521, and the graphic object 1532 displayed with the second notification message 1522 may have a shape based on the remaining time of the timer related to the display of the second notification message 1522. In other words, the electronic device 1510 may individually display the graphic objects 1531 and 1532 respectively in shapes based on the remaining time of the timers related to the display of the graphic objects 1531 and 1532. The electronic device 1510 may dismiss the display of the graphic object 1531 with the first notification message 1521 at a time point 1503 at which the shape transformation of the display module is completed and the timer related to the display of the first notification message 1521 is terminated. When the timer related to the display of the second notification message 1522 is not terminated at the time point 1503, the electronic device 1510 may continuously display the second notification message 1522 and the graphic object 1532 corresponding to the second notification message 1522.

Figure 16:
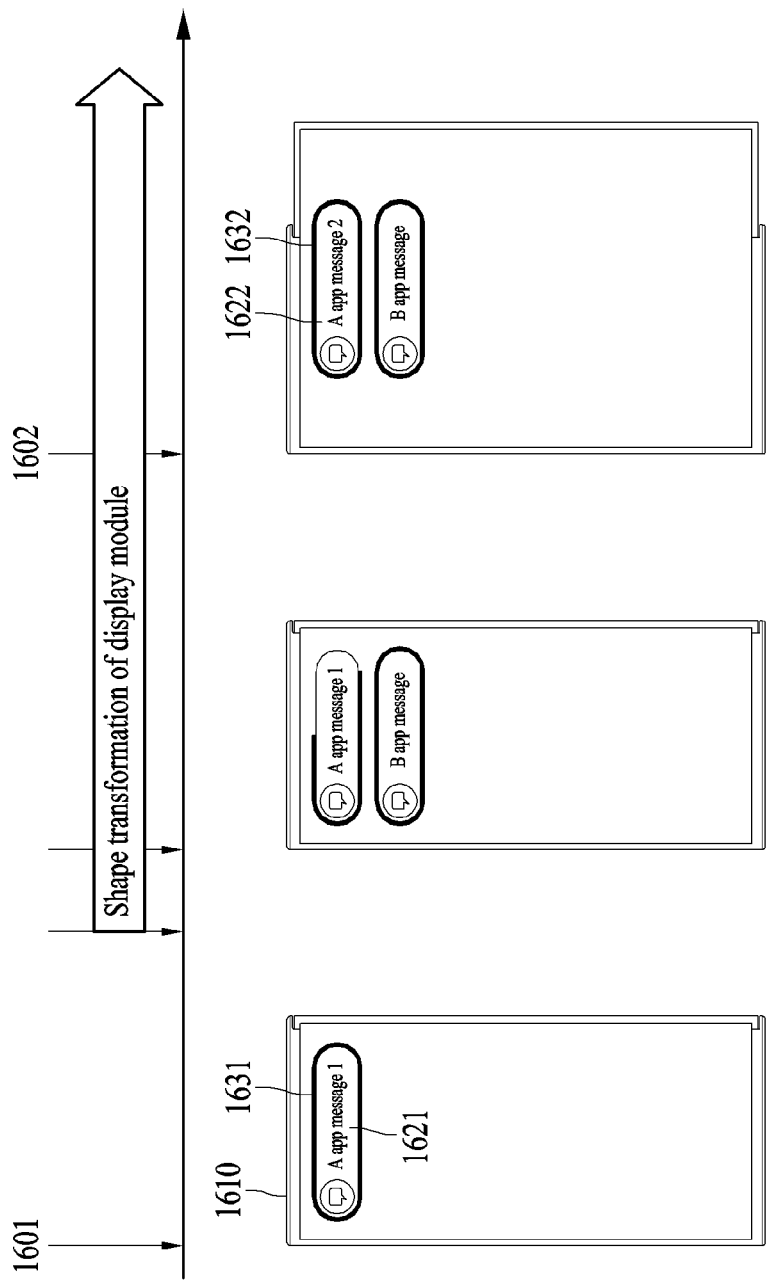
FIG. 16 is a diagram illustrating an operation of displaying a notification message corresponding to an event identified by the same application, according to one embodiment.

FIG. 16 is a diagram illustrating an operation of displaying a notification message corresponding to an event identified by the same application, according to one embodiment.

An electronic device 1610 (e.g., the electronic device 101 of FIG. 1) according to one embodiment may display, on a screen, a notification message corresponding to the most recently occurred event among a plurality of events that occurred for each application.

Referring to FIG. 16, the electronic device 1610 may identify an event that occurred in a first application (e.g., A application) at a time point 1601 before the beginning of shape transformation of a display module. The electronic device 1610 may display, on the screen, a notification message 1621 corresponding to a first event that occurred in the first application. The electronic device 1610 may set and execute a timer related to the display of the notification message 1621 and may display, together with the notification message 1621, a graphic object 1631 having a shape based on the remaining time of the timer related to the display of the notification message 1621.

During the shape transformation of the display module, the electronic device 1610 may identify a second event that occurred in the same first application at a time point 1602. The electronic device 1610 may display, on the screen, a notification message 1622 corresponding to the second event that occurred in the first application. The electronic device 1610 may wait to set and execute a timer related to the display of the notification message 1622 and may display, together with the notification message 1622, a graphic object 1632 having a shape based on the remaining time of the timer related to the display of the notification message 1622. The electronic device 1610 may display the notification message 1622 and the graphic object 1632 corresponding to the second event while dismissing the display of the notification message 1621 and the graphic object 1631 corresponding to the first event after the time point 1602. For example, since the electronic device 1610 waits to execute the timer related to the display of the notification message 1622 at the time point 1602, the remaining time of the timer may be the same as the duration of the timer related to the display of the notification message 1622. At the time point 1602, the electronic device 1610 may display the graphic object 1632 such that the notification message 1622 contacts the graphic object 1632 on the total circumference of the notification message 1622.

According to one embodiment, an electronic device may include: a display module transformable from a first shape to a second shape, a memory configured to store computer-executable instructions, and a processor configured to execute the computer-executable instructions by accessing the memory. The processor may be configured to identify an occurrence of an event for displaying a notification message on at least a portion of the display module, detect a beginning and an end of shape transformation of the display module from the first shape to the second shape, when the notification message is displayed in response to identifying the occurrence of the event before the beginning of the shape transformation of the display module, wait for dismissing the display of the notification message during the shape transformation of the display module from the first shape to the second shape, and when the occurrence of the event is identified during the shape transformation of the display module from the first shape to the second shape, wait to display the notification message during the shape transformation and display the notification message after the end of shape transformation of the display module.

The processor may be further configured to change the display of the notification message to a dismissible state in a time interval including a time point at which the shape transformation of the display module ends.

The processor may be further configured to display the notification message while a timer related to the display is executed and when the timer is terminated, dismiss the display of the notification message.

The processor may be further configured to, when the notification message is displayed in response to identifying the occurrence of the event before the beginning of shape transformation of the display module, pause a timer related to the display of the notification message in a time interval including a time point at which the shape transformation of the display module begins.

The processor may be further configured to, during the shape transformation of the display module, maintain the display of the notification message and during a time interval including a time point at which the shape transformation of the display module ends, display the notification message for a remaining duration of the timer by resuming the paused timer.

The processor may be further configured to, when the occurrence of the event is identified during the shape transformation of the display module from the first shape to the second shape, wait to execute a timer related to the display of the notification message during the shape transformation of the display module and execute the timer related to the display of the notification message in a time interval including a time point at which the shape transformation of the display module ends.

The processor may be further configured to delay the display of the notification message until a time point at which the timer is executed.

The processor may be further configured to change a duration of the timer related to the display of the notification message, based on a time interval from a time point at which the shape transformation of the display module begins to a time point at which the shape transformation of the display module ends.

The processor is configured to change the duration of the timer related to the display of the display module, based on a calculated time by applying a weight corresponding to a speed in which the shape of the display module transforms to the time interval.

The processor may be further configured to, while the notification message is displayed, display a graphic effect that reflects a change in a remaining duration of the timer related to the display of the notification message.

The processor may be further configured to, when the notification message is displayed in response to identifying the occurrence of the event before the shape transformation of the display module begins, deactivate the notification message by blocking a user input to select the notification message during the shape transformation of the display module and perform at least one of changing at least one of a graphic effect, transparency, brightness, and a color of the notification message in response to deactivation of the notification message and displaying an additional graphic object for indicating deactivation of the notification message.

The processor may be further configured to, when the notification message is displayed in response to identifying the occurrence of the event before the shape transformation of the display module begins and an occurrence of another event for displaying another notification message from another application that is different from an application of the notification message is identified during the shape transformation of the display module, additionally display the another notification message corresponding to the identified another event from the another application while maintaining the display of the notification message.

The processor may be further configured to adjust a duration of the timer related to the display of the notification message by a preset unit based on a user input.

According to one embodiment, a method implemented by a processor includes: identifying an occurrence of an event for displaying a notification message on at least a portion of a display module that is transformable from a first shape to a second shape, detecting a beginning and an end of shape transformation of the display module from the first shape to the second shape, when the notification message is displayed in response to identifying the occurrence of the event before the beginning of the shape transformation of the display module, waiting for dismissing the display of the notification message during the shape transformation of the display module from the first shape to the second shape, and when the occurrence of the event is identified during the shape transformation of the display module from the first shape to the second shape, waiting for displaying the notification message during the shape transformation and displaying the notification message after the end of shape transformation of the display module.

The method may further include changing the display of the notification message to a dismissible state in a time interval including a time point at which the shape transformation of the display module ends.

The method may further include displaying the notification message while a timer related to the display of the notification message is executed, and when the timer is terminated, dismissing the display of the notification message.

The waiting for dismissing the display of the notification message during the shape transformation of the display module may include, pausing a timer related to the display of the notification message in a time interval including a time point at which the shape transformation of the display module begins.

The waiting for dismissing the display of the notification message during the shape transformation of the display module may further include: maintaining the display of the notification message during the shape transformation of the display module, and during a time interval including a time point at which the shape transformation of the display module ends, displaying the notification message for a remaining duration of the timer by resuming the paused timer.

The displaying of the notification message after the end of shape transformation of the display module may include: waiting for executing a timer related to display of the notification message during the shape transformation of the display module, and executing the timer related to the display of the notification message in a time interval including a time point at which the shape transformation of the display module ends.

The method may further include changing a duration of the timer related to the display of the notification message, based on a time interval from a time point at which the shape transformation of the display module begins to a time point at which the shape transformation of the display module ends.

What is claimed is:

1. An electronic device comprising:
   a display module transformable from a first shape to a second shape;
   at least one processor; and
   a memory storing computer-executable instructions that, when executed by the at least one processor, cause the electronic device to:
   identify an occurrence of a first event for displaying a first notification message on the display module of the first shape,
   display the first notification message on at least a portion of the display module while a first timer related to the display of the first notification message is executed,
   detect a beginning of shape transformation of the display module from the first shape to the second shape,
   pause the first timer in a time interval including a time point at which the shape transformation of the display module begins,
   maintain the display of the first notification message during the shape transformation of the display module, and
   dismiss the display of the first notification message when the first timer is terminated.

2. The electronic device of claim 1, wherein the instructions cause the electronic device to change the display of the first notification message to a dismissible state in a time interval including a time point at which the shape transformation of the display module ends.

3. The electronic device of claim 2, wherein the instructions cause the electronic device to, while the first notification message is displayed, display a graphic effect that reflects a change in a remaining duration of the first timer.

4. The electronic device of claim 1, wherein the instructions cause the electronic device to, resume the first timer in a time interval including a time point at which the shape transformation of the display module ends, and display the first notification message for a remaining duration of the first timer.

5. The electronic device of claim 1, wherein the instructions cause the electronic device to change a duration of the first timer, based on the time interval from a time point at which the shape transformation of the display module begins to a time point at which the shape transformation of the display module ends.

6. The electronic device of claim 5, wherein the instructions cause the electronic device to change the duration of the first timer, based on a calculated time by applying a weight, corresponding to a speed in which the shape of the display module transforms, to the time interval.

7. The electronic device of claim 1, wherein the instructions cause the electronic device to,
deactivate the first notification message by blocking a user input to select the first notification message during the shape transformation of the display module, and perform at least one of changing at least one of a graphic effect, transparency, brightness, and a color of the first notification message in response to deactivation of the first notification message and displaying an additional graphic object for indicating the deactivation of the notification message.

8. The electronic device of claim 1, wherein the instructions cause the electronic device to, when an occurrence of a third event for displaying a third notification message from another application that is different from an application of the first notification message is identified during the shape transformation of the display module, additionally display the third notification message while maintaining the display of the first notification message.

9. The electronic device of claim 1, wherein the instructions cause the electronic device to adjust a duration of the first timer by a preset unit based on a user input.

10. A method implemented by an electronic device, the method comprising:
identifying an occurrence of a first event for displaying a first notification message on the display module of the first shape;
displaying the first notification message on at least a portion of the display module while a first timer related to the display of the first notification message is executed;
detecting a beginning of shape transformation of the display module from the first shape to the second shape;
changing a duration of the first timer, based on a time interval from a time point at which the shape transformation of the display module begins to a time point at which the shape transformation of the display module ends;
maintaining the display of the first notification message during the shape transformation of the display module, and
dismissing the display of the first notification message when the first timer is terminated.

11. The method of claim 10, further comprising:
when the occurrence of a second event is identified during the shape transformation of the display module, waiting for displaying the second notification message corresponding to the second event during the shape transformation and displaying the second notification message after the end of shape transformation of the display module.

12. The method of claim 11, wherein the displaying of the second notification message after the end of shape transformation of the display module comprises:
waiting for executing a second timer related to the display of the second notification message during the shape transformation of the display module; and
executing the second timer in a time interval including the time point at which the shape transformation of the display module ends.

13. The method of claim 10, further comprising:
changing the display of the first notification message to a dismissible state in a time interval including the time point at which the shape transformation of the display module ends.

14. The method of claim 10, wherein the maintaining of the display of the first notification message during the shape transformation of the display module comprises,
pausing the first timer in a time interval including the time point at which the shape transformation of the display module begins.

15. The method of claim 14, wherein the maintaining of the display of the first notification message during the shape transformation of the display module further comprises:
resuming the first timer in a time interval including the time point at which the shape transformation of the display module ends, and
displaying the first notification message for a remaining duration of the first timer.

16. An electronic device comprising:
a display module transformable from a first shape to a second shape;
at least one processor; and
a memory storing computer-executable instructions that, when executed by the at least one processor, cause the electronic device to:
detect a beginning of shape transformation of the display module from the first shape to the second shape,
identify an occurrence of an event for displaying a notification message on the display module during the shape transformation of the display module, and
start to display the notification message on at least a portion of the display module after the shape transformation of the display module ends,
wherein the instructions cause the electronic device to, wait to execute a timer related to the display of the notification message during the shape transformation of the display module and execute the timer in a time interval including a time point at which the shape transformation of the display module ends.

17. The electronic device of claim 16, wherein the instructions cause the electronic device to delay the display of the notification message until a time point at which the timer is executed.

* * * * *